United States Patent [19]
Yoshida et al.

[11] Patent Number: 5,162,923
[45] Date of Patent: Nov. 10, 1992

[54] METHOD AND APPARATUS FOR ENCODING FREQUENCY COMPONENTS OF IMAGE INFORMATION

[75] Inventors: Tadashi Yoshida, Ichikawa; Naoto Kawamura; Yoshihiro Ishida, both of Kawasaki; Yasuji Hirabayashi, Tokyo; Mitsuru Maeda, Yokohama, all of Japan

[73] Assignee: Canon Kabushiki Kaisha, Tokyo, Japan

[21] Appl. No.: 312,755

[22] Filed: Feb. 21, 1989

[30] Foreign Application Priority Data

| Feb. 22, 1988 | [JP] | Japan | 63-39823 |
| Feb. 22, 1988 | [JP] | Japan | 63-39824 |
| Feb. 22, 1988 | [JP] | Japan | 63-39825 |
| Feb. 22, 1988 | [JP] | Japan | 63-39826 |
| Feb. 22, 1988 | [JP] | Japan | 63-39827 |

[51] Int. Cl.$^5$ ............................................. H04N 1/41
[52] U.S. Cl. ................................... 358/433; 358/432
[58] Field of Search .............. 358/133, 426, 429, 432, 358/433, 75

[56] References Cited

U.S. PATENT DOCUMENTS

| 4,179,709 | 12/1979 | Workman | 358/433 |
| 4,447,886 | 5/1984 | Meeker | 358/133 |
| 4,504,860 | 3/1985 | Nicol et al. | 358/133 |
| 4,581,638 | 4/1986 | Chiariglione et al. | 358/433 |
| 4,734,767 | 3/1988 | Kaneko et al. | 358/133 |
| 4,774,574 | 9/1988 | Daly et al. | 358/133 |
| 4,780,761 | 10/1988 | Daly et al. | 358/133 |
| 4,797,945 | 1/1989 | Suzuki et al. | 382/56 |
| 4,814,871 | 3/1989 | Keesen et al. | 358/133 |
| 4,851,906 | 7/1989 | Koga et al. | 358/133 |
| 4,887,151 | 12/1989 | Wataya . | |
| 4,922,349 | 5/1990 | Abe et al. | 358/433 |
| 4,951,157 | 8/1990 | Koh et al. | 358/433 |
| 4,974,071 | 11/1990 | Maeda . | |

Primary Examiner—Edward L. Coles, Sr.
Assistant Examiner—Kim Yen Vu
Attorney, Agent, or Firm—Fitzpatrick, Cella, Harper & Scinto

[57] ABSTRACT

An image encoding method, and an apparatus therefor, enabling rapid comprehension of the outline of the entire image promptly, at the decoding of the encoded image information, and also an image encoding method, and an apparatus therefor, capable of efficient encoding adapted for the state of the image to be encoded. Image information is divided into plural block, each consisting of plural pixels, the frequency of the image in each block is analyzed, the frequency components of the image in each block are separated into plural bands, and the frequency components contained in each of said plural bands are encoded.

95 Claims, 22 Drawing Sheets

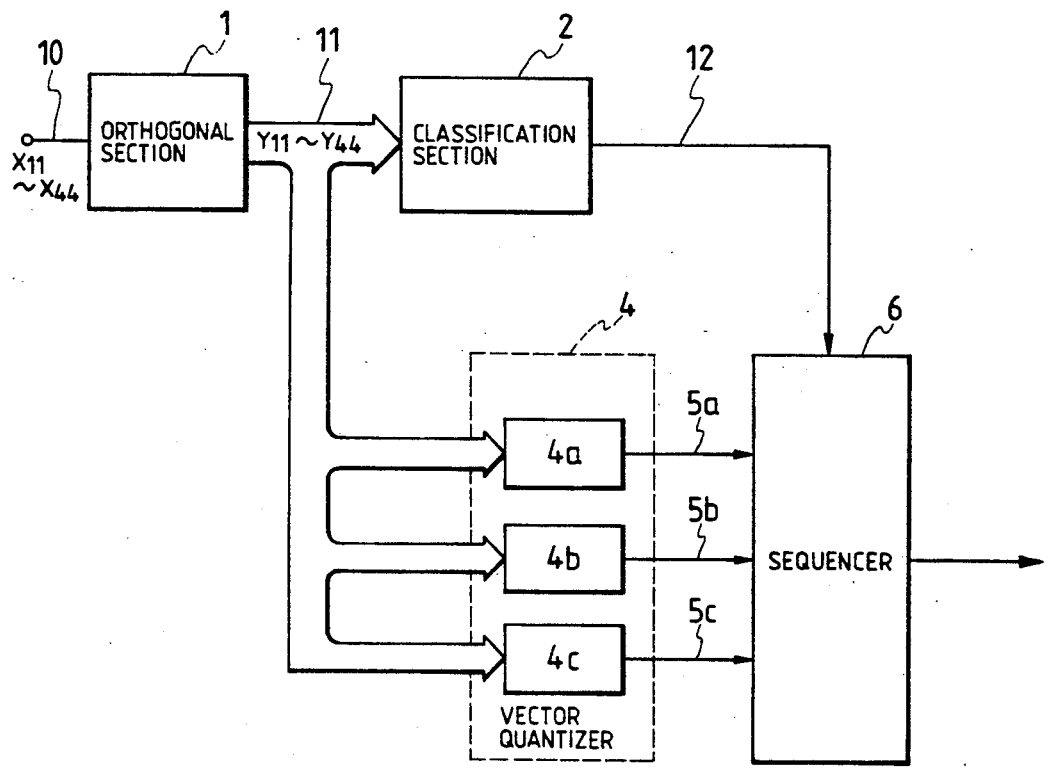
FIG. 1
FIG. 2A
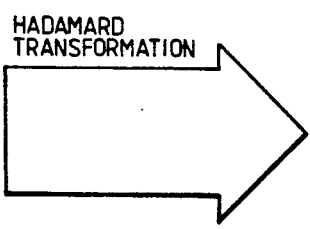
FIG. 2B

FIG. 7A
FIG. 7B
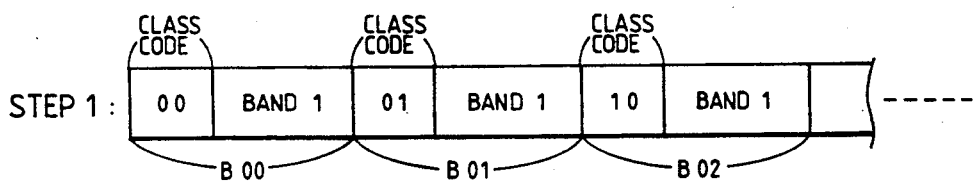
FIG. 8
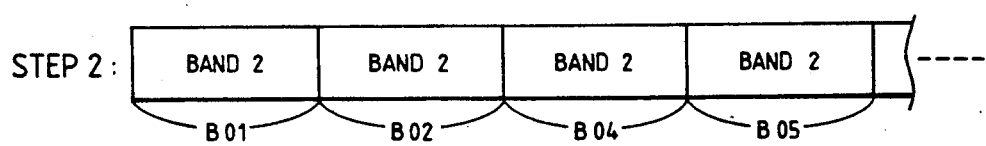
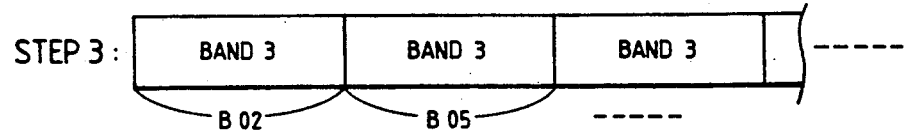

FIG. 9
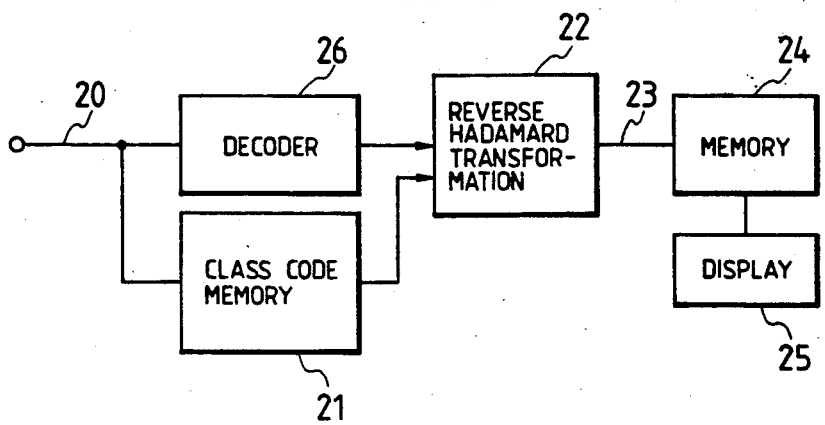
FIG. 10
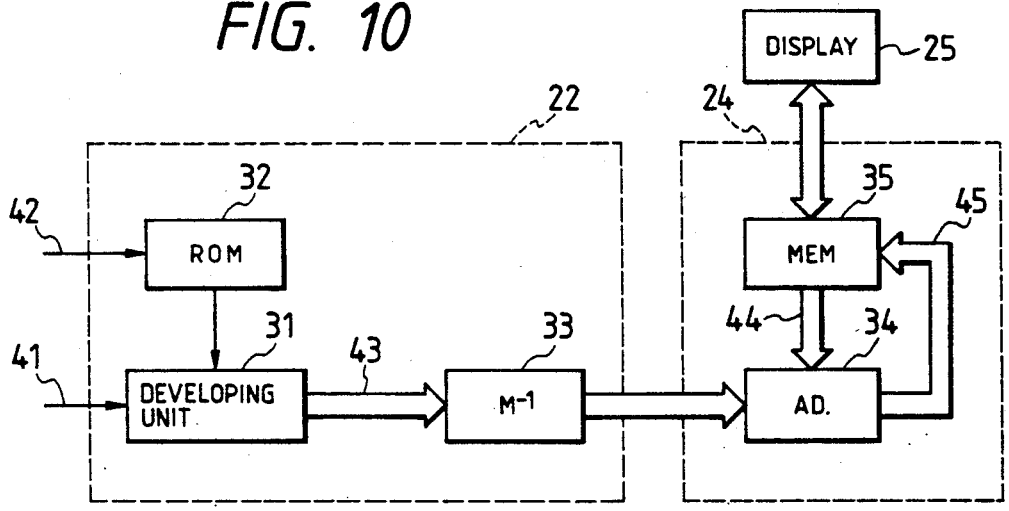
FIG. 11
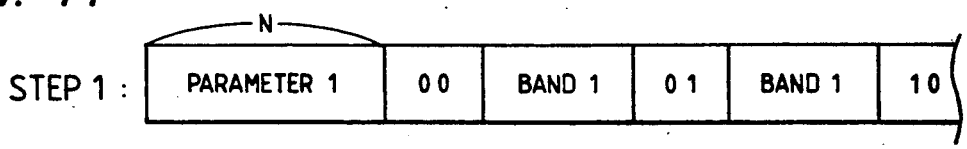
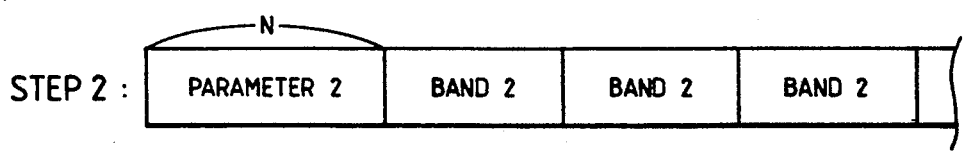
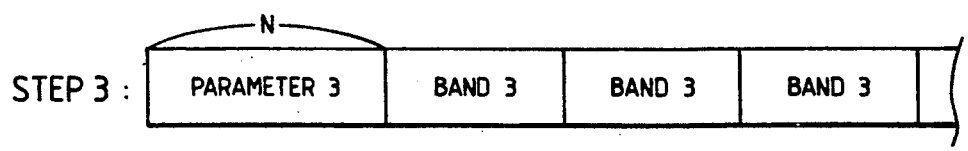

EDGE QUANTITY $ED = |Y_{12}| + |Y_{13}| + |Y_{21}|$
$+ |Y_{22}| + |Y_{31}|$

VERTICAL QUANTITY $VE = |Y_{12}| + |M_{13}| + |Y_{14}|$

HORIZONTAL QUANTITY $HE = |Y_{21}| + |Y_{31}| + |Y_{41}|$

FIG. 22
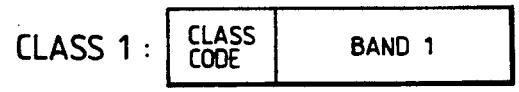
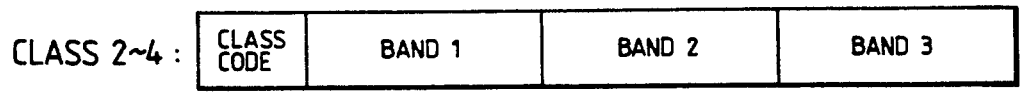
FIG. 23
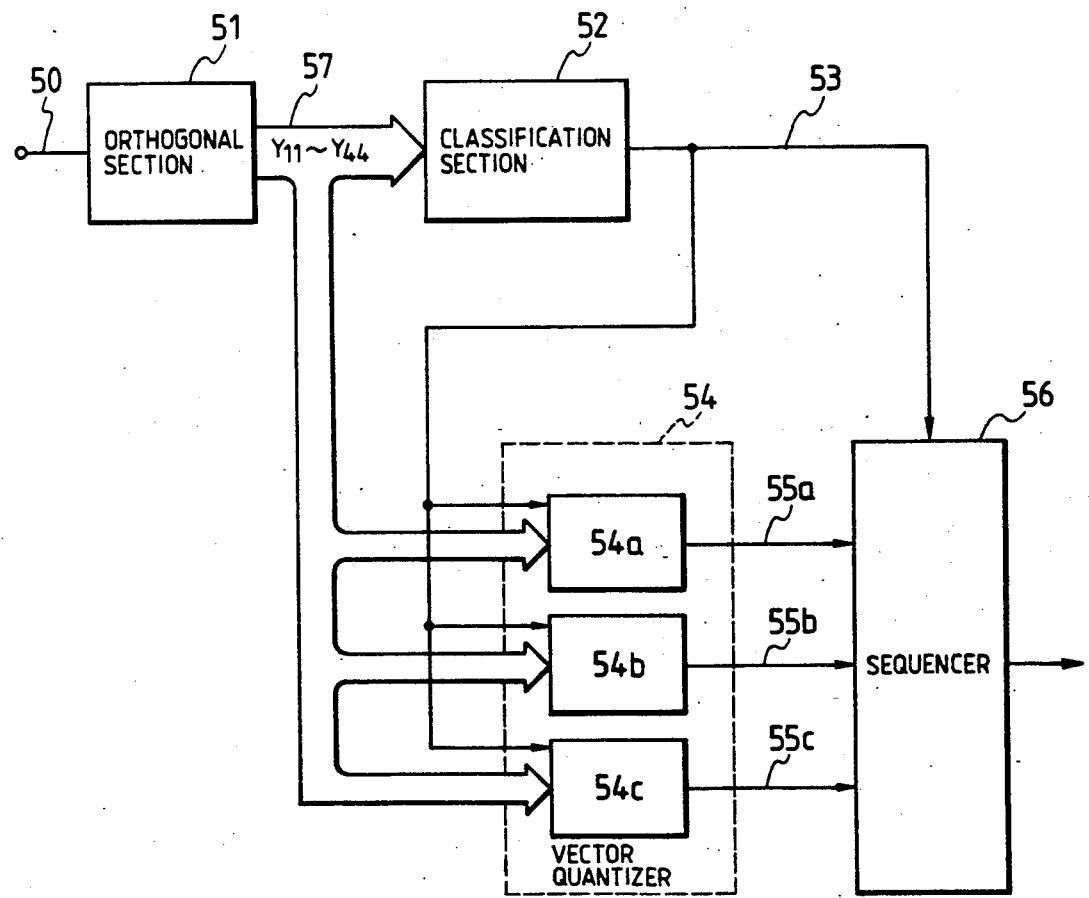

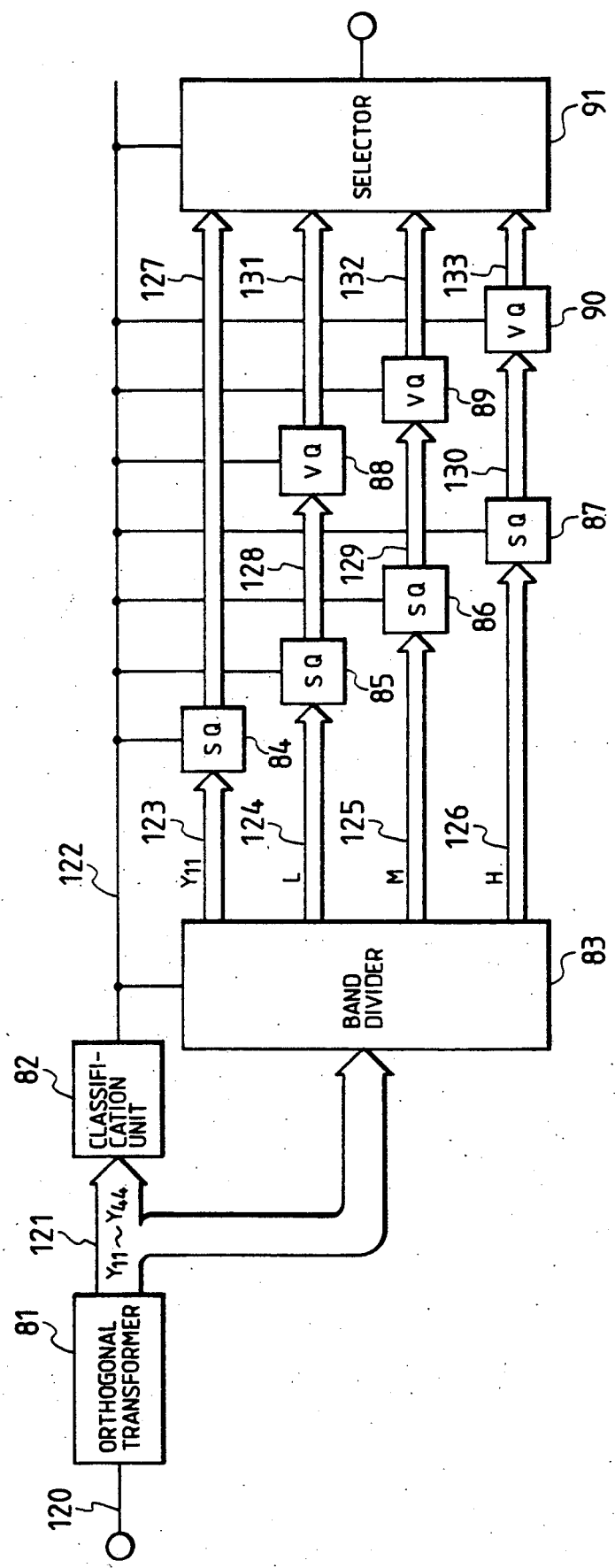

FIG. 28A
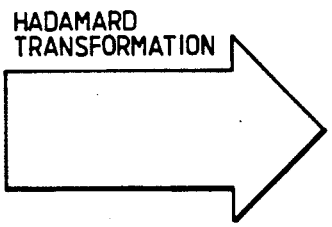
HADAMARD TRANSFORMATION
FIG. 28B
FIG. 29A
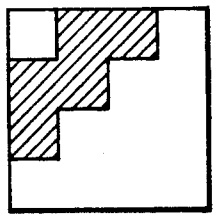
EDGE QUANTITY
ED = |Y₁₂| + |Y₁₃| + |Y₂₁|
   + |Y₂₂| + |Y₃₁|
FIG. 29B
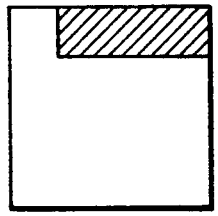
VERTICAL QUANTITY
VE = |Y₁₂| + |Y₁₃| + |Y₁₄|
FIG. 29C
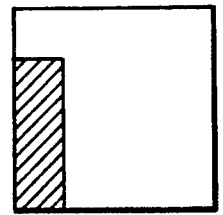
HORIZONTAL QUANTITY
HE = |Y₂₁| + |Y₃₁| + |Y₄₁|

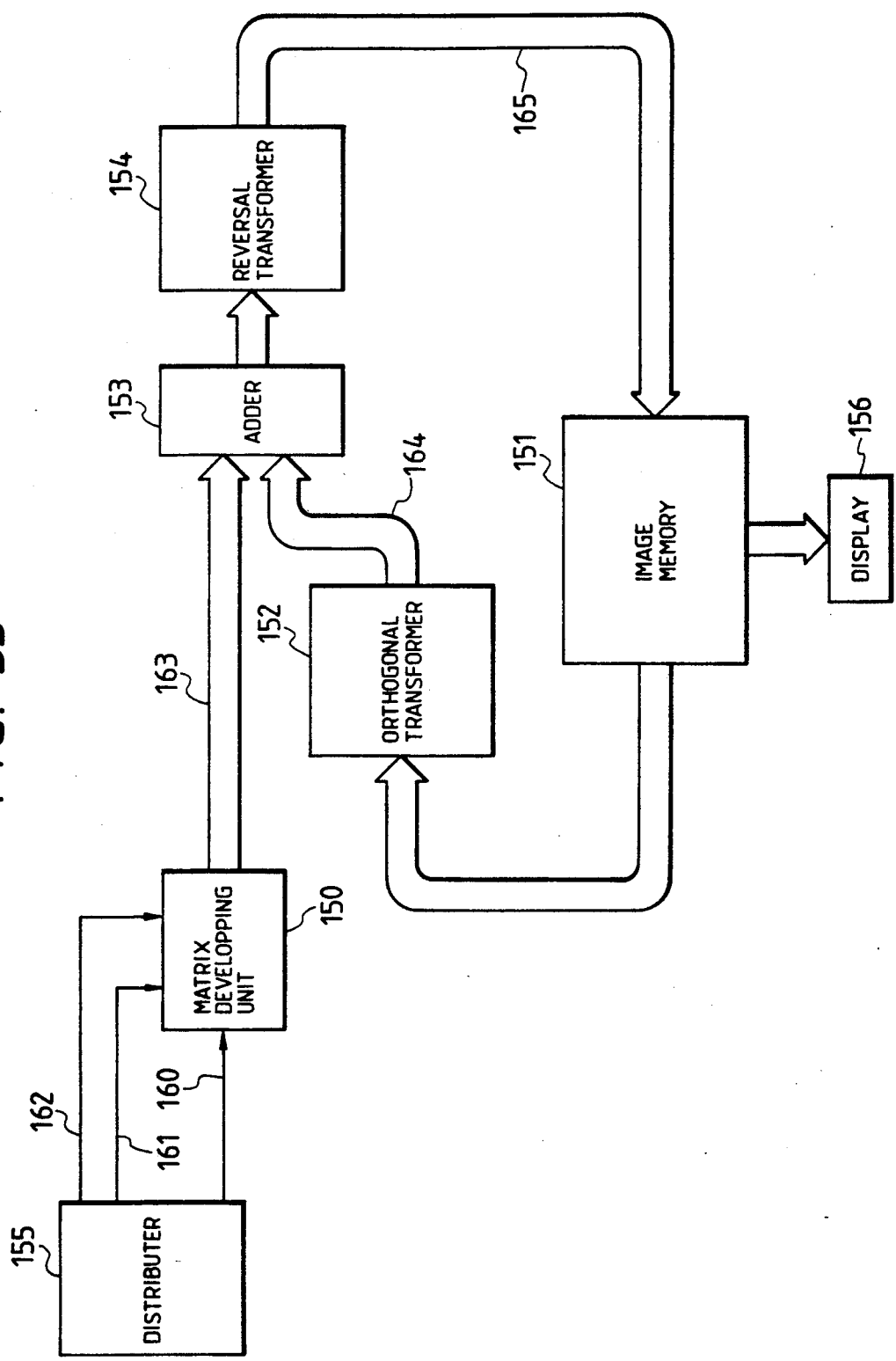

METHOD AND APPARATUS FOR ENCODING FREQUENCY COMPONENTS OF IMAGE INFORMATION

BACKGROUND OF THE INVENTION

1. Field of the Invention

The present invention relates to a method of encoding an image in the unit of a block of pixels, by dividing image information into plural blocks each consisting of plural pixels, and a method of decoding the encoded data obtained by such encoding, and an apparatus for executing such encoding and decoding.

2. Related Background Art

Since the amount of data encoded from an image is far larger than that of other encoded characters or symbols, there have been proposed various methods for compression, encoding and transmission for facilitating data storage and transmission.

In order to achieve highly advanced compression of continuous tone images or multi-level density images, there has been proposed to encode such images in the unit of a block of pixels, by dividing the image information into plural blocks each consisting of plural pixels.

Particularly in view of data storage, attention is attracted by the method of vector digitizing each image block consisting of plural pixels, as such method is theoretically capable of achieving performance close to the limit of rate distortion.

In such vector digitization, the reproduction vector is designed in advance by a training process with various images, and a reproduction vector, which provides a minimum distortion for the input image at the encoding, is utilized as the code for encoding. Consequently the optimum designing of the reproduction vector is an important factor in the vector digitization. In general, the optimum reproduction vector is determined by a vector digitizing algorithm called LBG method.

This method, however, being based on a principle of minimizing the average distance between the image for training process and the reproduction vector, tends to provide a reproduction vector that is biased by the average images for training process.

Also the vector digitizer is designed with such training process utilizing various images involving different spatial frequency, but, because usual images frequently contain areas of flat density, the image decoded from the encoded signals often shows image quality deterioration in the areas involving high spatial frequency components, such as in the image edges, through such image quality deterioration is less in the areas of flat image density. This is due to a fact that the percentage of edges is less in the training images, and that the amount of information larger in such edge areas than in the areas of flat image density.

Another drawback lies in a fact that the amount of calculation required for designing the digitizer increases logarithmically with the increase of number of order of the vector. Moreover, even if the reproduction vector can be designed, the amount of calculation required for determining a vector of minimum distortion for the input image also increases logarithmically.

Furthermore, the magnitude of the required hardware will be enormous. Particularly the vector digitizing of complete-search type is practically impossible to realize.

The vector digitization can be generalized as dividing a two-dimensional image into blocks, handling the N sample data constituting each block as an N-dimensional Euclidean space $R^N$, and executing a mapping conversion on $R^N$ for a finite number of subsets. Consequently the number of dimensions of such Euclidean space increases with the number of the sample images, and a corresponding hardware becomes difficult to realize.

For avoiding such drawbacks, it has been tried to incorporate many edges into the training images, or to effect artificial training.

However, the reproduction vector designed in such manner provides an unnatural digitized image.

Though it is also possible to classify the images by their nature and to design the reproduction vector for each class of images, but such method does not provide fundamental solution, because, as already explained above, the amount of information is larger in the edge areas than in the areas of flat image density. Also such method does not throw light in solving the above-mentioned drawbacks relating to the amount of calculation required or the difficulty in realization of hardware.

Furthermore, in the storage or transmission of the data encoded in the unit of block, the image reproduced from such encoded data may be deteriorated due to a distortion in the data resulting from the transmission characteristics of the system.

Furthermore, there may be required various image processings, such as image sharpness enhancement, for the transmitted image.

However the correction for the distortion in the transmission characteristics or the various image processings are sometimes required for the entire image or sometimes for certain frequency components only, and the conventional encoding method has been unable to satisfactorily respond to such requirements.

On the other hand, in such encoding in the unit of a block, the detailed original image is reproduced in the unit of block by an inverse conversion. Consequently such encoding method, in which the image is represented by the entire encoded data, is not suited for a quick-response transmission, such as transmitting a part of the encoded data at first for showing the outline of the entire image and then transmitting the rest of the encoded data for improving the tonal rendition and resolution of the image. Also it is not suited for such transmission as sending detailed data for certain image areas containing denser original information and sending rougher data for the remaining image areas.

For the purpose of improving man-machine interface, there has recently been desired an encoding method capable of sending rough image information at first and progressively improving the resolution with the lapse of time, thereby reproducing the detailed image information, but the conventional encoding methods have been unable to satisfactorily respond to such requirement.

In the conventional data compression encoding methods, the entire image cannot be comprehended until the encoded data of all the plural block constituting an image are decoded.

Consequently, in case of retrieving a desired image from the stored encoded data of plural images, the user cannot identify whether the currently decoded data represent the desired image, until the completion of decoding.

SUMMARY OF THE INVENTION

In consideration of the foregoing, an object of the present invention is to provide an encoding method, and an apparatus therefor, capable of satisfactorily encoding image information in a simple manner.

Another object of the present invention is to provide an image encoding method, and an apparatus therefor, enabling rapid comprehension of the outline of the entire image promptly, at the decoding of the encoded image information.

Still another object of the present invention is to provide an image encoding method, and an apparatus therefor, capable of efficient encoding adapted for the state of the image to be encoded.

Still another object of the present invention is to provide an image encoding method, and an apparatus therefor, capable of accommodating image conversion processes at the decoding of the encoded image information.

Still another object of the present invention is to provide an image decoding method, and an apparatus therefor, capable of providing a satisfactory reproduced image in a simple manner at the decoding of the encoded image information.

The foregoing and still other objects of the present invention, and the advantages thereof, will become fully apparent from the following description.

BRIEF DESCRIPTION OF THE DRAWINGS

FIG. 1 is a block diagram showing an encoding apparatus embodying the present invention;

FIGS. 2A and 2B are schematic views showing the concept of Hadamard transformation;

FIGS. 7A and 7B are views showing an example of image classification;

FIG. 8 is a view showing the transmission format of encoded data;

FIG. 9 is a block diagram of an example of the receiving circuit;

FIG. 10 is a partial detailed view of the circuit shown in FIG. 9;

FIGS. 11 and 13 are views showing the transmission format of encoded data with attached parameters;

FIGS. 12, 16, 17, 18, 19, 22 and 26 are views showing other transmission formats of the encoded data;

FIGS. 23 and 24 are block diagrams showing other examples of encoder;

FIG. 27 is a schematic view of an encoder for executing the method of the present invention;

FIGS. 28A and 28B are views showing the concept of Hadamard transformation;

FIGS. 29A to 29C are views showing an example of classifying method;

FIG. 33 is a schematic view showing the concept of a decoder;

DESCRIPTION OF THE PREFERRED EMBODIMENTS

Figure 3:
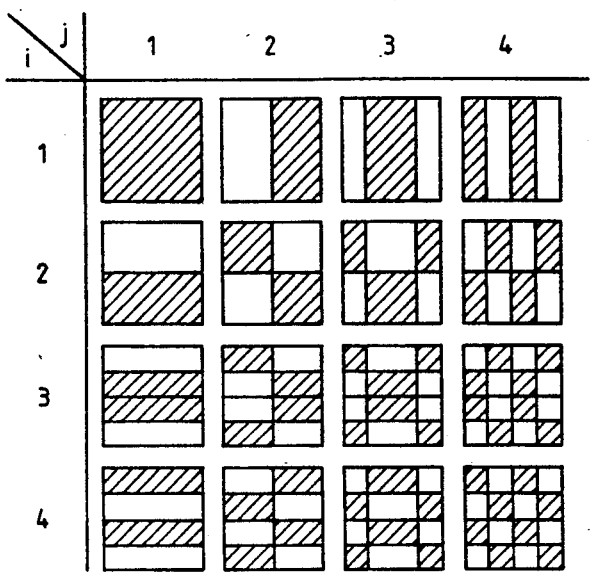
FIG. 3 is a chart showing a sequency component.

Now the present invention will be clarified in detail by preferred embodiments thereof.

At first there will be explained the principle of encoding employed in the present invention.

Firstly it is tried to reduce the number of dimensions of the N-dimensional Euclidean space by dividing it into plural sub-Euclidean spaces. This is achieved, for example, by dividing the interior of the block into sub-blocks and effecting vector digitization in each sub-block. Consequently the sub-block, containing pixels of a number M smaller than N, constitutes an Euclidean space $R^M$. A vector digitizer can be realized by selecting M at a value allowing practical hardware preparation.

For facilitating the division into such sub-blocks, the data of the block are transformed for example into a frequency space. For this purpose an orthogonal transformation into the frequency space is conducted in the unit of each block.

Information sources with a high level of correlation, such as images, generally show power concentration in the low frequency components in the frequency analysis. This property is utilized in forming the sub-blocks. Namely, an orthogonal transformation is conducted on the image, then the coefficients of such transformation are analyzed to divide the image into sub-blocks according to the property thereof, i.e. according to the frequency, and each sub-block is independently vector digitized. Such division into sub-blocks, conducted in the frequency space, shall be called band division. Such method dispenses with a large amount of calculation and a corresponding hardware.

Secondly, after the band division of a block, if said block has a large percentage of low frequency components, the low frequency bands alone are transmitted. This is because, in the flat density area (low frequency area) of the image, the high frequency components are not required and the low frequency components alone need to be transmitted. Such operation shall be called classification. Such classification is made solely by the information on the components in the block, and the image quality deterioration in the edge areas of the image can therefore be prevented.

Thirdly, there is employed a transmission system, for thus band divided and classified encoded data, of transmitting each frame from the low frequency portion to high frequency portions in succession. More specifically, at first the encoded data of a low frequency portion of the blocks are transmitted for an entire frame, then the encoded data of higher frequency are transmitted for the entire frame, and those of a still higher frequency are transmitted. The decoding process is correspondingly repeated at the receiving side, so that the resolution of the decoded image is improved in succession from lower frequencies to higher frequencies. Such transmission system, called progressive transmission, realizes a rapid transmission response in the coarse image, and also the transmission may be terminated in the course of transmission. Such progressive transmission is conducted in the unit of band obtained by orthogonal transformation of the image, and various operations are executed for each band as will be explained later.

In such progressive transmission, the outline of the image can be seen only with the transmission of the low frequency bands, since most power is concentrated in the flat density areas (low frequency areas) of the image as explained before. Also the low frequency bands can be transmitted at a high speed, by selecting shorter code lengths for the image of the low frequency bands.

Fourthly, in the progressive transmission of each band, there are applied various transformations, such as the correction of frequency (modulation transfer function) of the image, extraction of edges of Affine transformation, for each band either in the real space or in the frequency space.

In the following there will be given detailed explanation on the embodiments of the present invention, utilizing such encoding and transmitting methods as explained above.

FIG. 1 is a schematic view of an image encoding apparatus embodying the present invention.

An orthogonal transformation unit 1 executes an orthogonal transformation on each block (unit block in the present embodiment being composed of 4×4 pixels) of an image entered through a signal line 10. In the present embodiment an Hadamard transformation of 4×4 pixels is employed as said orthogonal transformation. Said Hadamard transformation converts the image of each unit block, consisting of 4×4 pixels, into 16 transformation coefficients ($Y_{11}, Y_{12}, \ldots Y_{44}$). A signal line 11 is used for said transformation coefficients. FIG. 2 shows the concept of the Hadamard transformation. The pixel data $X_{11}, X_{12}, \ldots, X_{44}$ contained in a 4×4 matrix block shown in FIG. 2A are converted, by the Hadamard transformation, into sequence components $Y_{11}, Y_{12}, \ldots, Y_{44}$ shown in FIG. 2B, respectively corresponding to the patterns shown in FIG. 3. As will be understood from FIG. 3, larger values of i, j correspond to higher frequency components.

Figure 4A:
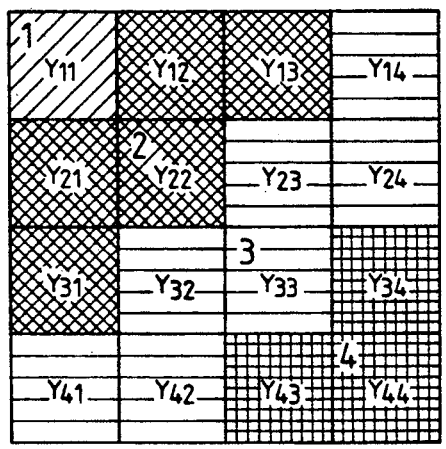
FIGS. 4A and 4B are charts showing an example of band division.
Figure 4B:
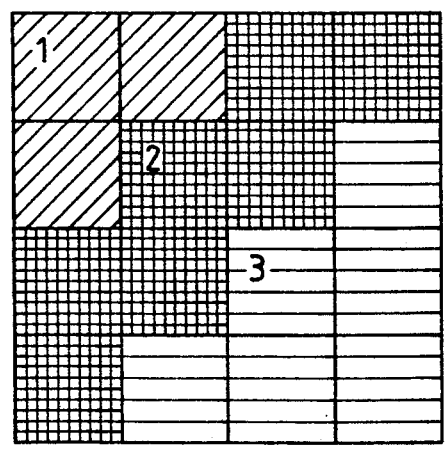

The components $Y_{11}-Y_{44}$ obtained by orthogonal transformation in the orthogonal transformation unit 1 are divided into bands as shown in FIG. 4. FIGS. 4A and 4B respectively show examples of division into 4 bands and 3 bands. In case of division into three bands shown in FIG. 4B, three components $Y_{11}, Y_{12}$ and $Y_{21}$ constitute a first sub-block, or a band 1 of low frequency. Then seven componenets $Y_{13}, Y_{14}, Y_{22}, Y_{23}, Y_{31}, Y_{32}$ and $Y_{41}$ constitute a second sub-block or a band 2 of intermediate frequency and remaining components constitute a third sub-block or a band 3 of high frequency.

A vector digitizers 4, shown in FIG. 1, effect vector quantization or digitization, respectively of three bands representing three sub-blocks explained above. The vector quantizers 4a–4c are constructed independently, and such independent structure for three bands enables to reduce the number of dimensionals and to reduce the magnitude of the quantizers.

Each of the vector quantizers 4a–4c is composed of a look-up table, for example stored in a ROM, for selecting an optimum reproduction vector for an input vector. It is assumed that such optimum reproduction vectors are determined in advance, from training data for respective bands.

A classification unit 2, shown in FIG. 1, classifies the blocks according to the frequency, by analyzing the coefficients $Y_{11}-Y_{44}$ supplied from the transformation unit 1. Said classification unit 2 classifies the blocks into four classes according to the frequency, and releases classification data of 2 bits to a signal line 12.

Figure 5:
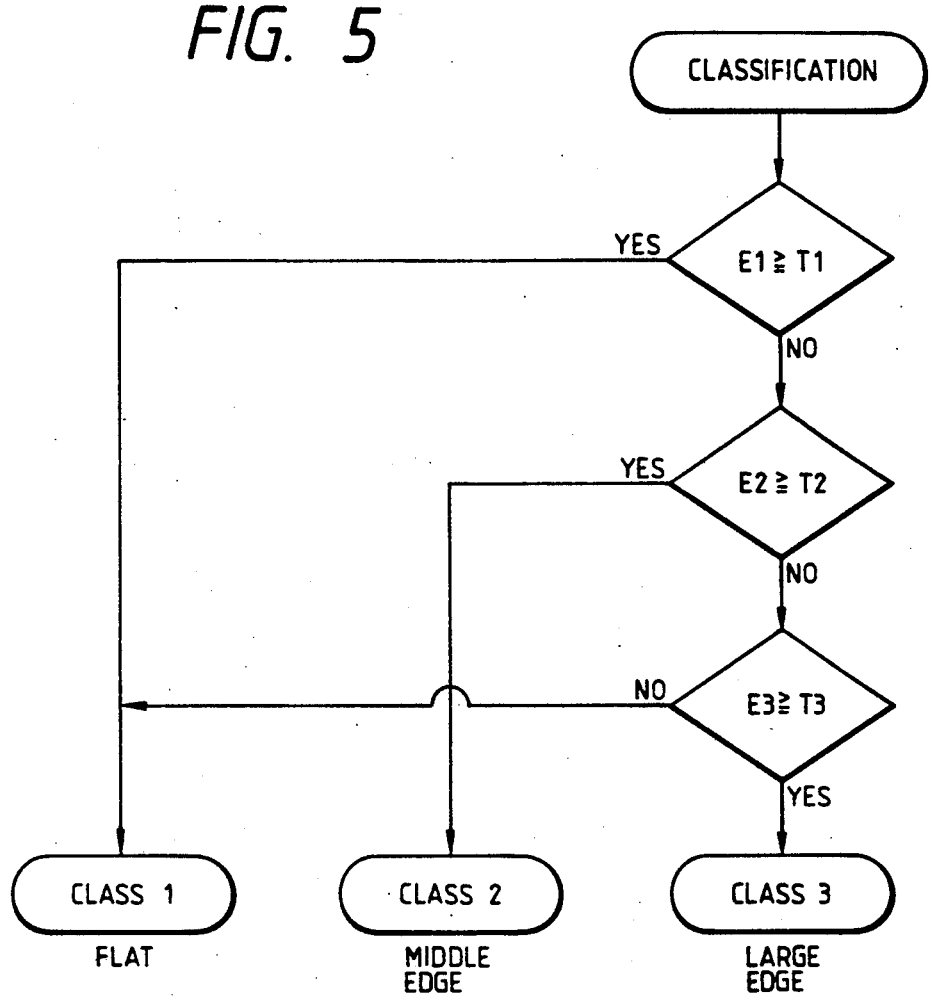
FIG. 5 is a flow chart showing the control sequence of classification.

FIG. 5 shows the sequence of classification in said classification unit 2.

In this embodiment there are employed following definitions:

$$E1 = \frac{1}{3}\{|Y_{11}| + |Y_{12}| + |Y_{21}|\}$$
$$E2 = \frac{1}{7}\{|Y_{13}| + |Y_{14}| + |Y_{22}| + |Y_{23}| + |Y_{31}| + |Y_{32}| + |Y_{41}|\}$$
$$E3 = \frac{1}{6}\{|Y_{24}| + |Y_{33}| + |Y_{34}| + |Y_{42}| + |Y_{43}| + |Y_{44}|\}$$

The above-mentioned E1, E2 and E3 are average values of the bands shown in FIG. 48.

As shown in FIG. 5, if $E1 \geq T1$ (threshold value), the block is classified as a class 1 (flat area) of low frequency. If $E2 \geq T2$, the block is classified as a class 2 (medium edge) of intermediate edge), and, if $E3 \geq T3$, the block is classified as a class 3 (large edge) of high frequency. A block not satisfying any of the conditions $E1 \geq T1$, $E2 \geq T2$ and $E3 \geq T3$ is classified as a flat area of the class 1, since the power is low over the entire bands.

According to such classification, the number of bands in the data to be transmitted is selected larger for the class of higher frequency.

Figure 6:
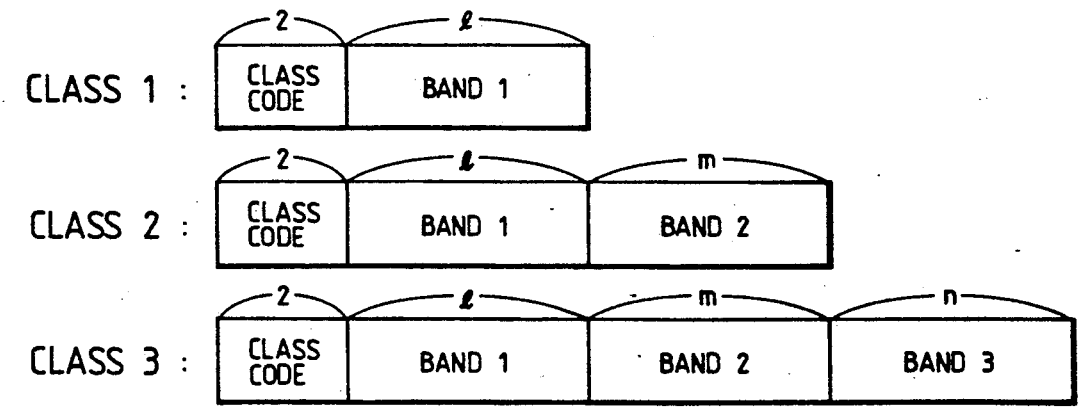
FIG. 6 is a view showing the structure of encoded data.

More specifically, as shown in FIG. 6, the data of the band 1 of a length l (vector digitized data of the low frequency component) only are selected for a block of the class 1 (flat area). For a block of the class 2 (medium edge), there are selected the data of the band 1 of length l and the data of the band 2 of length m (vector digitized data of the intermediate frequency component), and, for a block of the class 3 (large edge), there are selected the data of the bands 1, 2, 3 of lengths l, m, n, including the vector digitized data of the high frequency component.

A high data compression rate can be expected by applying classification and band division to each block after orthogonal transformation, and effecting the encoding according to the image quality. This is because usual image information is rich in the flat density areas of the class 1 that can be represented by short data length. As shown in FIG. 6, the data of each class are preceded by a class code as an index. There are required 2-bit class codes for representing three classes, as indicated in the following:

class 1: class code 00 (binary)
class 2: class code 01 (binary)
class 3: class code 10 (binary).

In some of the embodiments to be explained later, a class code 11 is used for representing the class 3, for the purpose of convenience. Naturally the length of the class code varies according to the number of classes.

In the following there will be explained the function of a sequencer 6 shown in FIG. 1.

The reproduction vectors 5a–5c, obtained in the vector quantizers 4a–4c are assembled for each band by the sequencer 6, and are transmitted for each band, according to the classification data 12.

FIG. 7 shows an example of the above-explained classification for each of the block $B_{00}$–$B_{mn}$ of a two-dimensional image. (a) indicates the numbers of said blocks, and (b) indicates the results of classification of said blocks.

FIG. 8 illustrates the process of transmission of the data encoded from the image shown in FIG. 7A. A step 1 transmits the data of the band 1 of all the blocks $B_{00}$–$B_{mn}$ constituting the image frame. A next step 2 transmits the data of the band 2, and a step 3 transmits the data of the band 3.

In said steps 2 and 3, it is not required to transmit the band data of all the plural blocks constituting the image. More specifically, the data of the band 2 are transmitted corresponding to the blocks of the classes 2 and 3, and those of the band 3 are transmitted corresponding to the blocks of the class 3.

Whether each block requires data transmission of the bands 2, 3 in the steps 2, 3 is identified by the class code, attached to the data of the band 1 of each block and transmitted with said data in the step 1, and said class code is memorized in each block at the receiving side. Thus the data of the bands 2, 3 are picked up only in the blocks requiring such data, based on said class codes.

FIG. 9 shows the signal processing method at the receiving side. A reception signal 20, consisting of the data of each band of the blocks, is received in the order of steps shown in FIG. 8.

The class codes of a frame, transmitted together with the data of the band 1 in the step 1, are temporarily stored in a class code memory 21. The data of the band 1 in the reception signal 20 are decoded by a decoder 26 into the vector digitized data, and are further converted by a reverse Hadamard transformer 22 into real space data 23. The real output data 23 thus obtained are supplied for example to an image memory 24, and a corresponding image is displayed on a display unit 25.

The process for the reception signal 20 in the step 2 or 3 varies according to the class code stored in the class code memory 21, in the following 1) class code=1 (binary code "00");
The block is skipped because it has no high frequency band componenets.

2) class code=2 (binary code "01);
Reverse Hadamard transformation is conducted only on the data of the band 2.

3) class code=3 (binary code "10");
Reverse Hadamard transformation is conducted on the data of the bands 2 and 3.

In this manner the consecutively transmitted high band codes (data of the bands 2 and 3) are recognized as the data of the target block, through comparison with the content of the class code memory 21.

As explained above, the data transmitted, for each band are independently reverse transformed, and the data of each block thus obtained are added to the data of previous reverse transformation already stored in the memory 24, and a final decoded image can be obtained in this manner.

Thus data transmission with an elevated compression efficiency and with an improved image transmission response can be achieved by dividing the image data into the bands of low, intermediate and high frequency components through an orthogonal transformation, and transmitting said bands independently.

The improved image transmission response means that the outline of the entire image is transmitted at first, though the tonal rendition and the sharpness are poor. The tonal rendition and the sharpness of the image are improved later by superposing the subsequently transmitted data, and it is possible to recognize the entire image as quickly as possible, and to obtain an image of certain image quality level even when the transmission is interrupted for some reason.

Such fast response is particularly suited for the transmission of a moving image. Also in case of still images, rapid recognition of the entire image is important for image retrieval, since the visual observation is common for image searching.

Also the high compression efficiency is valuable in reducing the time for transmission and reducing the space required for storage.

FIG. 10 shows the structure of the reverse Hadamard transformer 22 and the memory 24 shown in FIG. 9.

A developing unit 31 develops data, entered from a signal line 41, into blocks. At the same time a class code is supplied from the class code memory 21 through a signal line 42, for defining the spectral position of the input band, through a ROM 32. There are also provided a reverse converter 33, an adder 34, an image memory 35, and buses 43, 44, 45.

The class code supplied through the signal line 42 enters the ROM 32, which provides the developing unit 31 with positional information for the codes, supplied through the signal line 41, in the 4×4 spectral space. In response the developing unit 31 generates a 4×4 spectrum only containing the transmitted band data and masked with "0" in other positions.

The 16 data thus generated enters the reverse converter 33 to generate data in the real image space, which are stored in the memory 35 through the adder 34. If the memory 35 already stores image data of other bands which are previously regenerated, said data are read from said memory 35 and supplied to the adder 34, together with the data from the reverse converter 33. The result of addition in the real image space is stored again in the memory 35 through the bus 45.

The image data thus stored in the memory 35 are displayed on the display unit 25. Consequently, the display unit 25 at first shows the image of the band 1, or of the low frequency componenet, representing the outline of the image to be reproduced. Subsequently the image of the band 2 or the intermediate frequency component is superposed, and finally the image of the band 3 or the high frequency component is superposed.

It is therefore possible to recognize the image roughly, before the decoding of all the encoded data constituting the image frame.

In the foregoing embodiment, the Hadamard transformation is employed for frequency conversion, but there may also be employed other orthogonal transformations such as cosine transformation or K-L transformation. Also the order of transmission of the bands is not limited.

As explained in the foregoing, the structure shown in FIG. 10 provides a decoding method for codes obtained by dividing the image data into plural blocks each consisting of plural pixels and encoding the image of each block with plural encoding data respectively representing different frequency components. In this decoding method, the image information obtained by decoding the encoded data of the first frequency component in later added by that of the second frequency component in the real image space, so that the images of different frequency components can be reconstructed without complex process. Also it is possible to roughly recognize the image even in the course of decoding.

It is furthermore possible to effect various transformation in the course of data transmission in different bands. In the following there will be explained an example correction of the modulation transfer function (MTF), with emphasis of high frequency components.

In general, in a transmission system, the sharpness of the image is deteriorated as the high frequency signal components are deteriorated by the transfer characteristics of the input unit, analog processing system etc. For this reason it became necessary to somewhat increase the gain of the high frequency components in the transmitting of receiving side.

FIG. 11 shows the transmission format of the data when various transformations are required. Prior to the transmission of the data of a band, a coefficients (parameters 1, 2 or 3) for the correction of said bands is transmitted. It is also possible to transmit all the parameters 1, 2 and 3 in advance. In the embodiment shown in FIG. 11, a parameter is transmitted before the transmission of the data of a band.

Said parameter represents a coefficient corresponding to the gain of the data of each band. Thus the Hadamard converted value Y' is given by:

$$Y' = a_1 \cdot (\text{value of band 1}) + a_2 \cdot (\text{value of band 2}) + a_3 \cdot (\text{value of band 3})$$

wherein $a_1$, $a_2$ and $a_3$ are respectively the gains for the bands 1, 2 and 3. The high frequency components can be emphasized in the reproduced image by selecting $a_1 < 1$, $a_2 > 1$ and $a_3 > 1$.

On the other hand, the low frequency components can be emphasized by $a_1 > 1$, $a_2 < 1$ and $a_3 < 1$.

In such transformation, data:

$$\text{gain } (a_i) \cdot (\text{value of band i})$$

is transmitted for each band. Such transmission is possible because of a fact that the different bands can be linearly added, and that the real data can be added after the reverse Hadamard transformation for each band, as the Hadamard transformation is a linear transformation.

Figure 12:
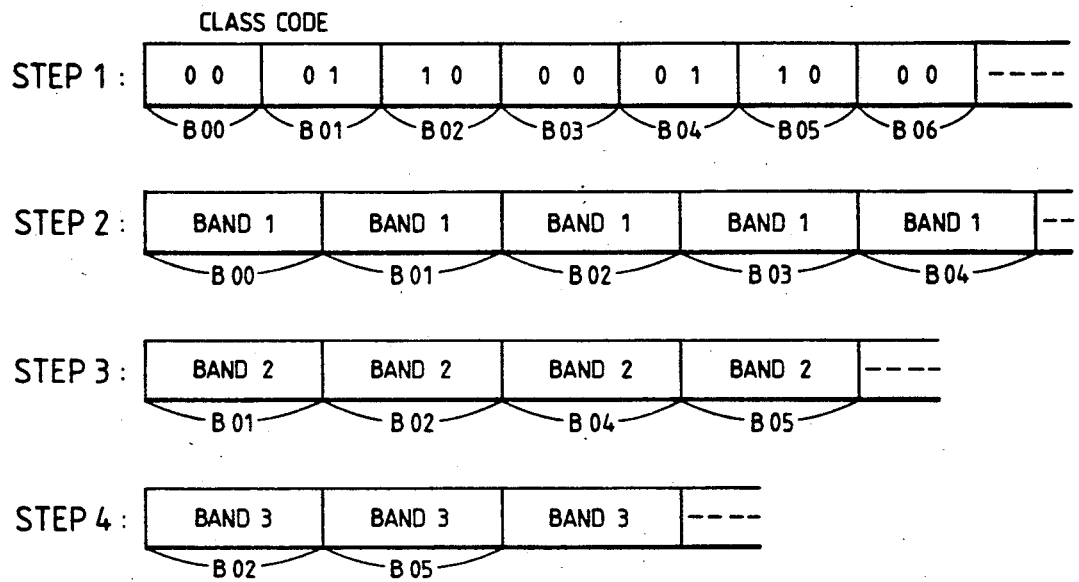

FIG. 12 shows another transmission method of the encoded data by the sequencer 6. The classification and the band division are conducted in the same manner as in the preceding embodiment, for example on an image shown in FIG. 7A. In this embodiment, a step 1 transmits all the class codes of the blocks constituting the image frame. Then steps 2, 3 and 4 respectively transmit the data of the band 1, 2 and 3.

In the steps 3 and 4, the band data need not be transmitted for all the blocks. The data of the bands 2, 3 are transmitted only for the blocks requiring such data.

Whether each block requires data transmission of the bands 2, 3 in the steps 3, 4 is identified by the class code, collectively transmitted for all the blocks in the step 1. Said class codes are memorized at the receiving side, and the data of the bands 2, 3 are picked up only in the blocks requiring such data, based on said class codes.

At the receiving side, the data transmitted in the step 1 are stored in the class code memory 21 shown in FIG. 9, and, in the step 2, the data of all the blocks are processed in succession by the reverse Hadamard transformer 22. The process in the steps 3 and 4 is identical with that in the steps 2 and 3 in the preceding embodiment.

This embodiment causes a certain delay in the image transmission response because the image data are not transmitted until the completion of the step 1, but the load of the decoder can be reduced as the separation of the class code and the band data is no longer necessary.

In the following there will be explained the method of data transformation in the embodiment shown in FIG. 12.

Figure 13:
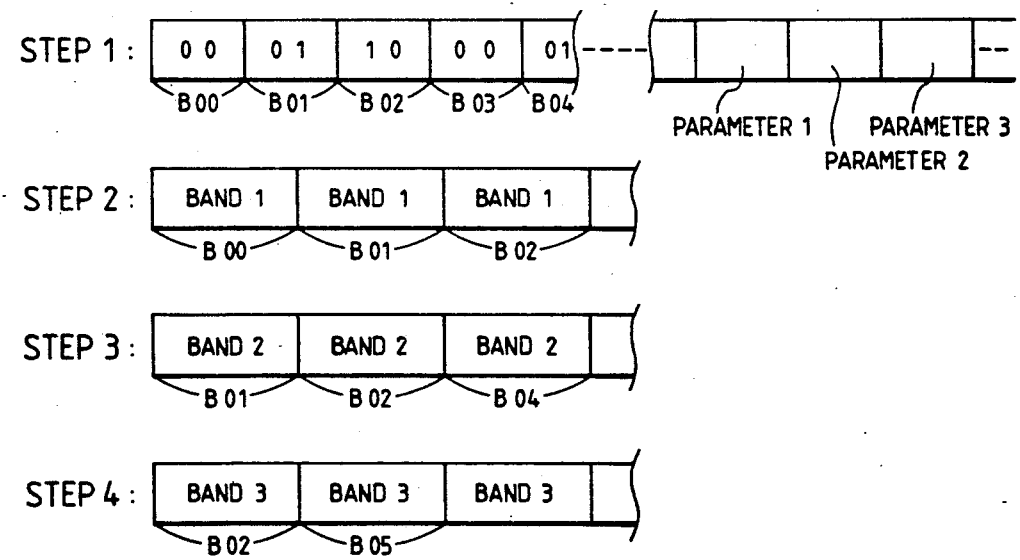

As shown in FIG. 13, parameters 1, 2, 3 representing the correction coefficients are transmitted, in the step 1, following the class codes.

Let us consider a case of effecting a reverse transformation on the orthogonally transformed data at the receiving side to obtain the original read data, and effecting a spatial filtering for each band (or for each step in FIG. 11).

Figures 14, 15A, 15B:
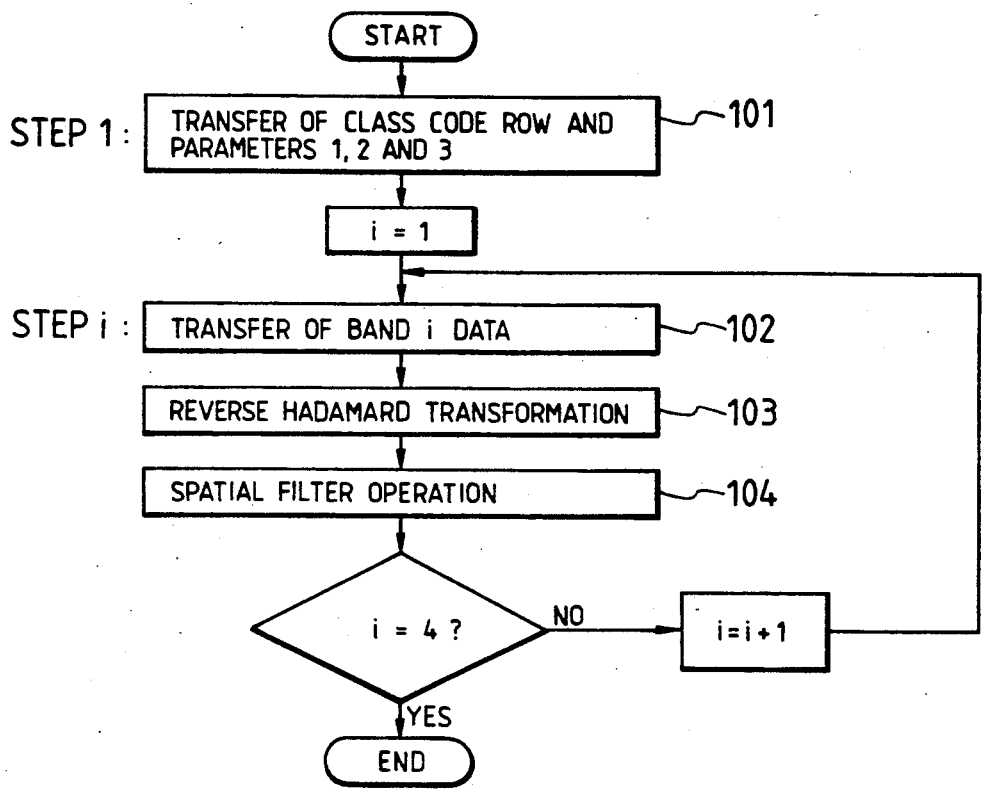
FIG. 14 is a flow chart showing a conversion sequence.
FIGS. 15A and 15B are views showing an example of Laplacian filter.

FIG. 14 shows a flow chart for said transformation. A step 101, corresponding to the step 1 shown in FIG. 13, transmits the class codes and the transformation parameters. Said transformation parameter is used, for example in case of edge enhancement, for selecting a 3×3 or 5×5 Laplacian filter for edge detection as shown in FIG. 15A or 15B, or designating a coefficient $\beta$ in the convolution calculation for edge enhancement conducted according to a principle:

central pixel data + $\beta \cdot$ (Laplacian output).

A step 102 effects the transmission of the data of the bands corresponding to the steps 2–4. Then a step 103 executes the reverse Hadamard transformation, in the transformer 22, for the received band data, and the obtained data are added in the image memory 24. Also the blocks not requiring the band data are skipped, according to the class codes.

A step 104 executes spatial filtering on the reverse transformed data, according to the aforementioned parameters. Said parameters may be determined at the receiving side.

The above-explained sequence is repeated for the number of bands, and the transformation for MTF correction can be achieved in this manner.

In the following there will be explained still another embodiment of the transmission of the encoded data by the sequence 6.

In this embodiment, the step 2 shown in FIG. 12 is executed at first, and is then followed by the steps 1, 3 and 4.

More specifically, at first the data of the band 1 or the low frequency component are transmitted. Subsequently transmitted, in succession, are the class codes, data of the intermediate frequency components and those of the high frequency components. Therefore, in comparison with the transmission shown in FIG. 12, the present embodiment quickens the image response, thus providing more rapidly the image represented by the low frequency components only.

In the data transmission shown in FIG. 8 or 12, an improvement in the compression efficiency can be expected by run-length encoding of the class codes. In such case an encoder and a decoder for run-length encoding are respectively required in the encoding and decoding units.

In the following there will be explained still another embodiment of transmission of the encoded data by the sequencer 6.

The classification and the band division in the present embodiment are identical with those in the preceding embodiment. However, the class code 3 involving the data of the bands 2 and 3 is represented by "11", and the data transmission is conducted in steps shown in FIG. 16.

At first a step 1 transmits the data of the band 1 of all the blocks constituting the image. Then a step 2 transmits bit data, of which each bit indicates whether each block constituting the image has the data of the band 2. Said bit "0" or "1" respectively indicates the absence or presence of the band 2. A step 3 then transmits the data of the band 2. Then a step 4 transmits bit data, of which each bit indicates whether each block constituting the image has the data of the band 3. The bit "0" or "1" indicates respectively absence or presence of the band 3. Subsequently a step 5 transmits the data of the band 3.

In the receiving side, the data of the step 1 are decoded in succession. Then, in the step 2, the data are stored in the class code memory 21 shown in FIG. 9. In the step 3, the data of the band 2 are decoded for the corresponding blocks, based on the data stored in said class code memory 21. In the step 4, the data are stored in the class code memory 21 shown in FIG. 9, instead of the data of the step 2, and, in the step 5, the data of the band 3 are decoded for the corresponding blocks, based on the data stored in said class code memory 21.

In the present embodiment, the number of transmission steps increases, but the capacity of the class code memeory 21 of the decoder, shown in FIG. 9, can be reduced in comparison with that in the preceding embodiment.

Figure 16:
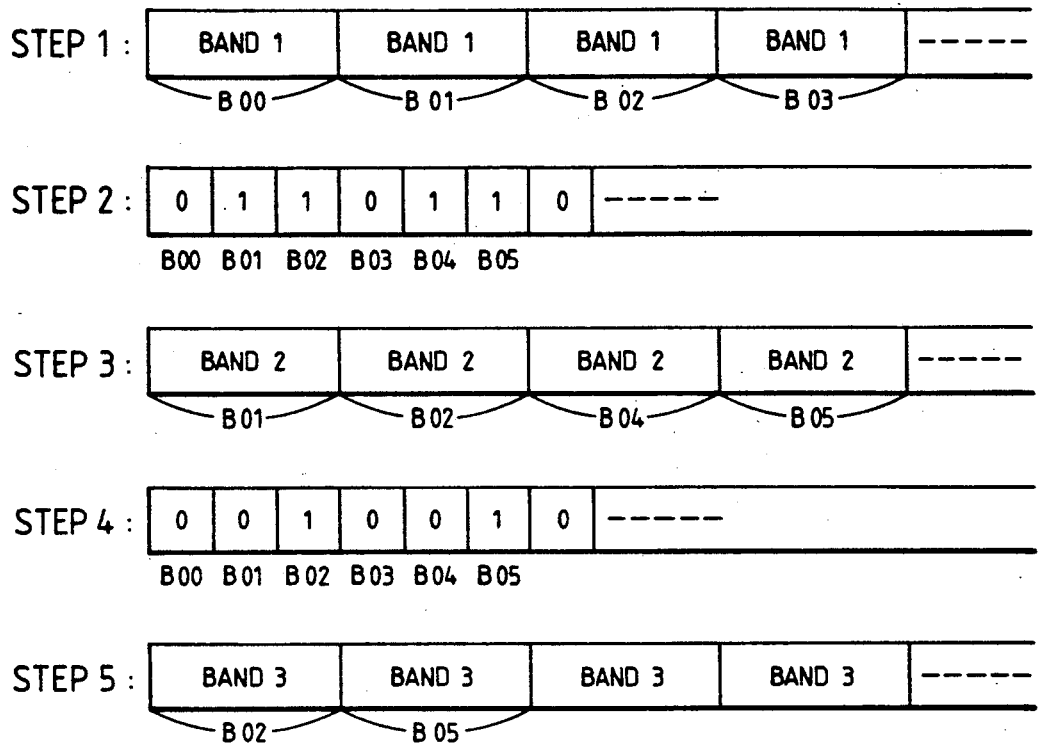
Figure 17:
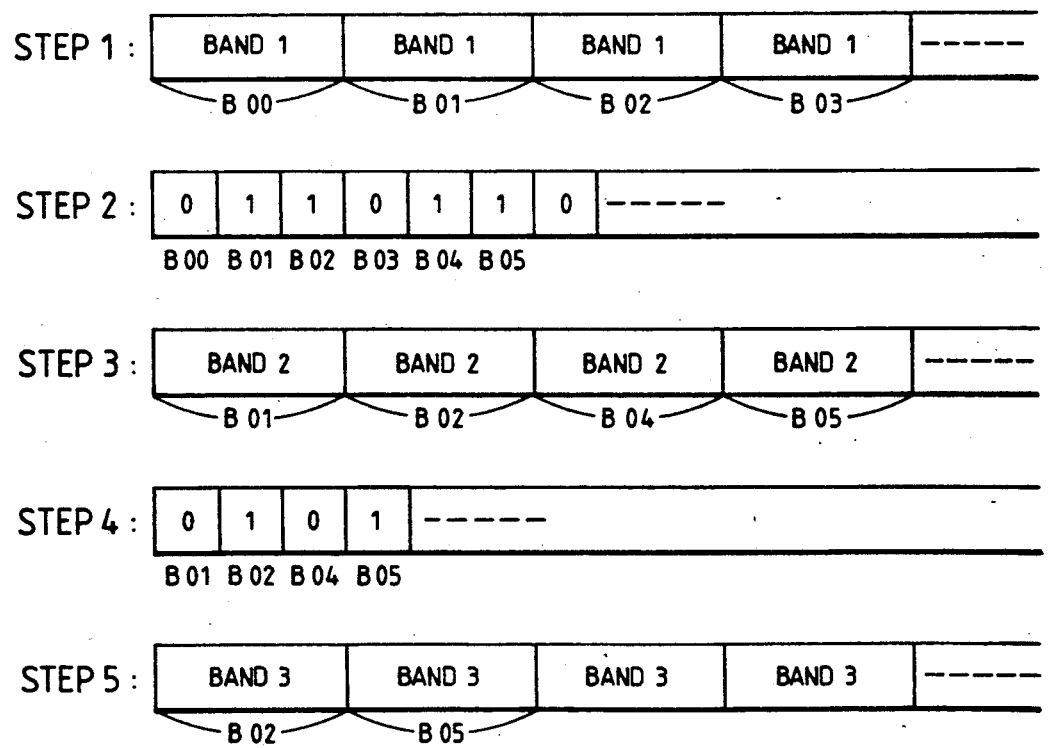

In the step 4 of the embodiment shown in FIG. 16, the data of the band 3 are only transmitted to all or a part of the blocks to which the data of the band 2 have been transmitted. It is therefore possible in one step 4, as shown in FIG. 17, to transmit bit data 0 or 1, indicating whether the data of the band 3 are to be added, only to the blocks where the data of the step 2 are "1". This embodiment requires a somewhat complex process in the step 4, but the compression efficiency is further improved.

In the following there will be explained still another method of transmission of the encoded data shown in FIG. 18.

Figure 18:
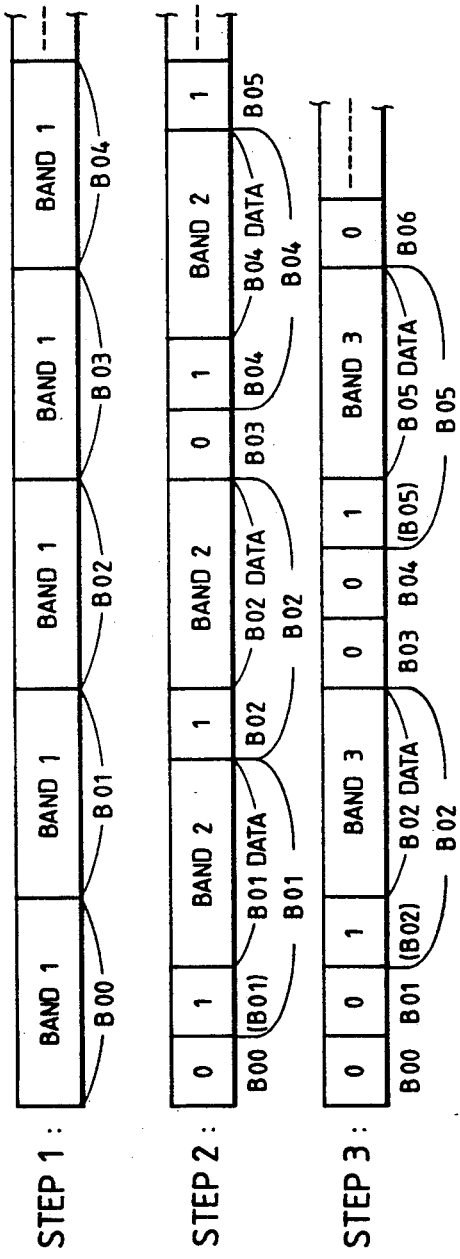

The classification and the band division are conducted in the identical manner as in the embodiment shown in FIG. 8, but the sequence of the data transmission is conducted as shown in FIG. 18.

A step 1 transmits the data of the band 1 of all the blocks in the image. In a step 2, a 1-bit signal, indicating the presence or absence of the data of the band 2 respectively by "1" or "0", is transmitted for each block, and, in case of the presence, said signal "1" is immediately followed by the data of the band 2. In a step 3, the data of the band 3 are transmitted in a similar manner as in the step 2.

In the receiving side, in the step 2 or 3, it is easily possible to determine the position of the data of the band 2 from said one-bit signal and to decode the data of the band 2 or 3 in succession.

Figure 19:
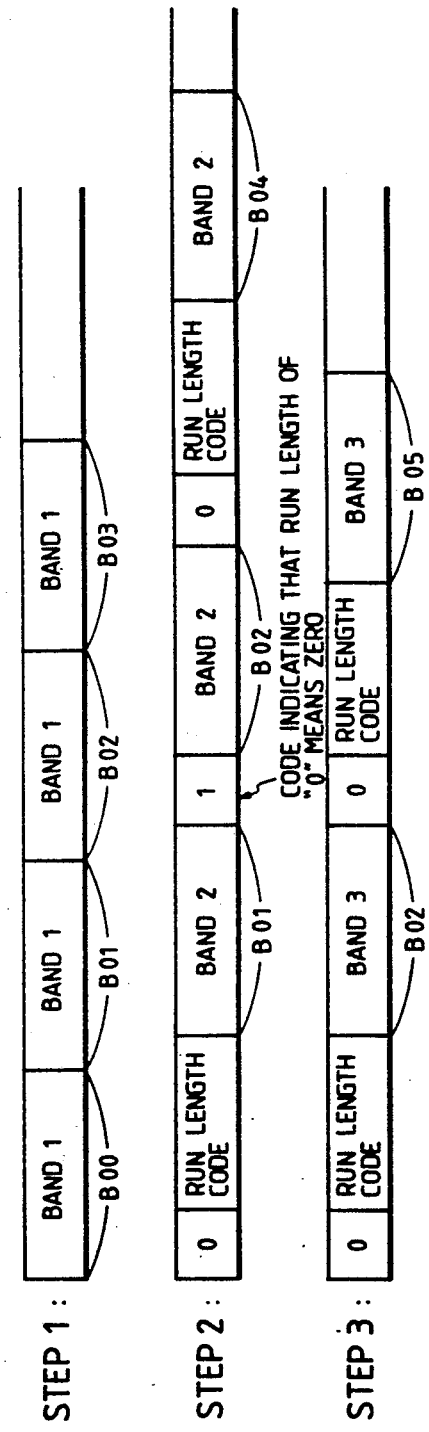

Also in the step 2 or 3 in the transmission process shown in FIG. 18, the bits "0" continue in succession if the blocks not having the data of the band 2 or 3 exist continuously. Such continuous string of the bits "0" can be run-length encoded as shown in FIG. 19. This method can achieve more efficient compression, in comparison with the embodiment shown in FIG. 18.

In the following there will be explained an embodiment employing different sub-blocks of band division and classification. It is assumed that the band division is conducted in the same manner as shown in FIG. 4B.

Figure 20A:
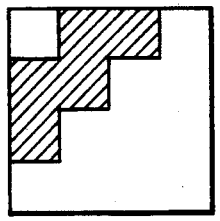
FIGS. 20A to 20C and 25 are views showing other classifying methods.
Figure 20B:
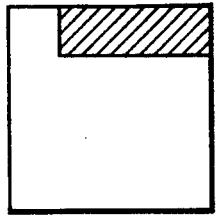
Figure 20C:
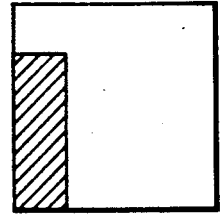
Figure 21:
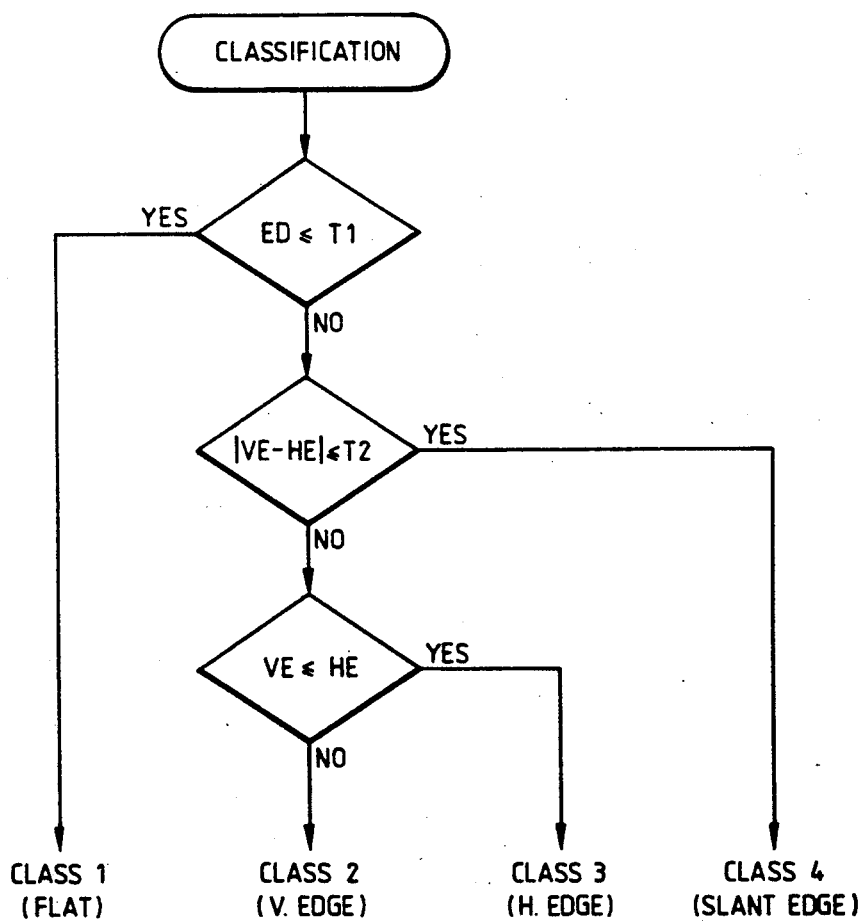
FIG. 21 is a flow chart showing another classifying sequence.

For achieving classification employing Hadamard transformation coefficients, there are defined three edge quantities as shown in FIG. 20A, 20B and 20C. The elements in the blocks shown in FIG. 20 correspond to those in FIG. 2B. FIG. 20A shows an example of calculation for determining the edge quantity ED. Hadamard transformation of an image involving an edge causes power concentration in the hatched area, increasing the value $ED = |Y_{12}| + |Y_{13}| + |Y_{21}| + |Y_{22}| + |Y_{31}|$. This property is utilized in a flow chart shown in FIG. 21, in which a block is defined as class 1 (flat area) if $ED \leq T1$ (threshold value). Also an image involving a vertical edge causes power concentration in a hatched are in FIG. 20B, increasing a vertical edge quantity $VE = |Y_{12}| + |Y_{13}| + |Y_{14}|$, while an image involving a horizontal edge causes power concentration in a hatched area in FIG. 20C, increasing a horizontal edge quantity $HE = |Y_{21}| + |Y_{31}| + |Y_{41}|$, and these properties are utilized in the classification. Also a slant edge is usually found if the differnece of the vertical edge quantity VE and the horizontal edge quantity $|VE - HE|$ is small. These properties are utilized, as shown in FIG. 21, for defining the class 2 (vertical edge), class 3 (horizontal edge) or class 4 (slant edge). In FIG. 21, T2 is a threshold value for discriminating the slant edge.

FIG. 22 shows the code formats in different classes. The encoded data corresponding to a flat area of the class 1 are composed solely of the data of the band 1, while those corresponding to an edge-containing area of the class 2, 3 or 4 are composed of the data of all the bands 1, 2, 3. This is because a vertical edge, a horizontal edge or a slant edge has high frequency components.

There is employed a class code of two bits for representing four classes, because the reproduction vector in the vector quantizer for each band is changed according to the class. Also the vector quantization of part-search type is employed instead of the all-search type.

FIG. 23 shows an embodiment of the image encoding apparatus. An orthogonal transformer 51 provides vector quantizers 54 for encoding the block output data with a classification signal 53, indicating said classification. Said signal 53 switches the table space of a look-up table in the vector quantizer 54, thereby selecting a reproduction vector adapted for each class.

A sequencer 56 executes, like the sequencer 6 in the preceding embodiment, the transmission of the encoded data according to the sequence shown in FIG. 22 and depending on the classification signal from a classification unit 52. The orthogonal transformer 51 executes Hadamard transformation for each block as in the preceding embodiment, and, in the vector quantizing unit 54, the quantizers 54a–54c execute vector quantization for respective bands.

In the following there will be explained an embodiment in which the band division is adaptively determined according to the classification. The classification is conducted in the same manner as in the embodiment shown in FIGS. 20 and 21.

Figure 24:
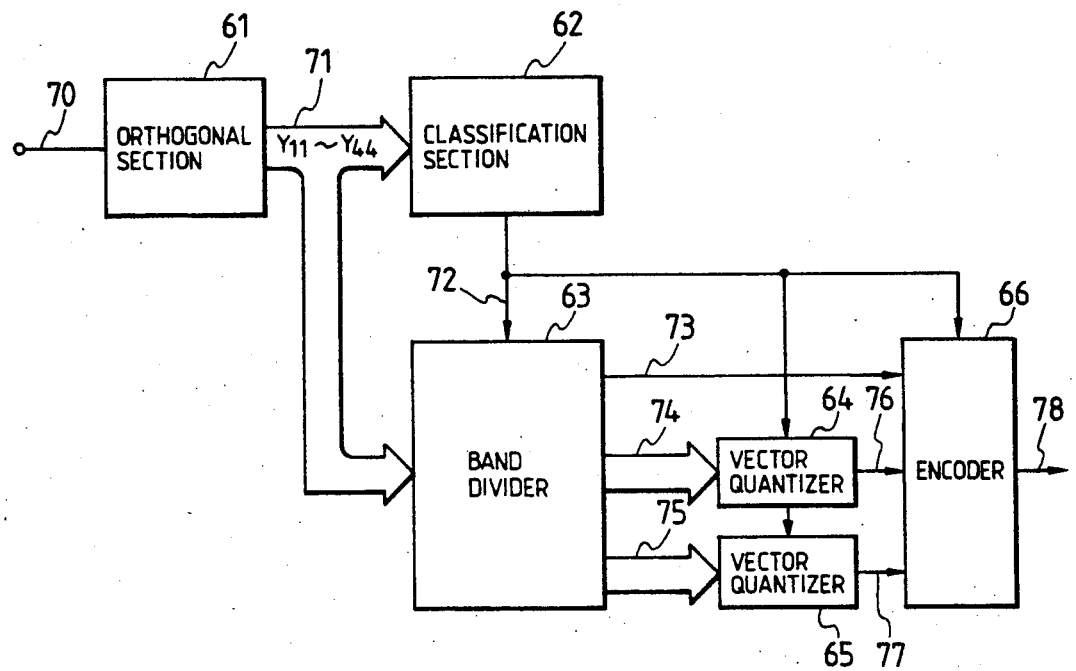
Figure 25:
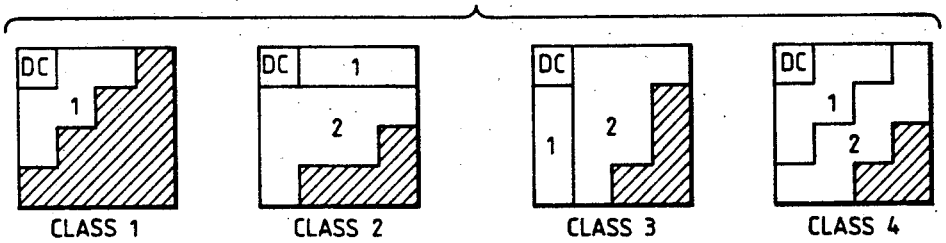

In FIG. 24, there is provided a band divider 63, which receives a 2-bit signal, indicating four classes determined by a classification unit 62. According to the classification signal, said band divider 63 divides $Y_{1-1}-Y_{44}$ into bands as shown in FIG. 25, respectively corresponding to a flat area (class 1), vertical edge area (class 2), horizontal edge area (class 3) or slant edge area (class 4). In FIG. 25, DC indicates a DC component of the image in $Y_{11}$, while "1" and "2" indicate band numbers, and a hatched area is an area to be masked "0" without quantization.

Said hatched area is not quantized because it has very low power. Also, the amount of information is generally less in the flat area of the image than in an edge-containing area. Utilizing these properties, the present embodiment divides the flat area (class 1) into DC and the band 1 only, and the edge-containing area (class 2, 3 or 4) into DC, the band 1 and the band 2. In this manner the redundancy in the flat area of the image can be eliminated. In this manner a larger number of bands is given to the image involving higher frequency. Also the number of dimensions of each band is limited to seven or eight, thereby reducing the magnitude of the vector quantization, and enabling all-search type digitization.

Figure 26:
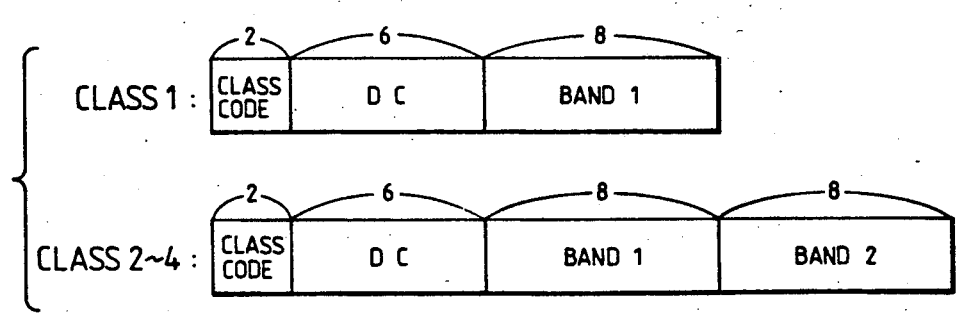

The number of bits of encoding in each class can be selected as shown in FIG. 26, whereby a larger amount of information can be given to the edge portion and the rate of compression of encoding can be improved at the same time.

In the example shown in FIG. 26, the class 1 allots 6 bits to DC and 8 bits to the band 1, whereas the class 2, 3 or 4 allots 6 bits to DC and 8 bits each to the band 1 and 2. The data of the bands 1 and 2 in each class are independently vector quantized by vector quantizers 64, 65.

In FIG. 24, a signal line 73 is used for transmitting the DC componenet of 6 bits, divided in the band divider 63, to an encoder 66. Signal lines 74, 75 are provided for transmitting the Hadamard transformation coefficients of the bands 1 and 2, divided in the band divider 63, to the vector quantizers 64, 65, having look-up tables for selecting optimum reproduction vectors in response to input vectors respectively of the bands 1 and 2. In the present embodiment the classification and the band division explained above are conducted on various images of different frequencies, and the look-up tables are prepared with the optimum reproduction vectors determined from independent trainings for the bands 1 and 2. 256 reproduction vectors (8 bits) are determined for each of the bands 1 and 2. However, for the class 1, the vector quantization is conducted only for the band 1. A 2-bit classification signal is supplied to the quantizers 64, 65 through a signal line 72 to select the content of the look-up tables according to the class.

An encoder 66 encodes the classification signal 72, DC component 73 and vector quantized data 76, 77 of the bands 1, 2 to obtain codes of a format shown in FIG. 26. The image encoded in this manner can be transmitted through a signal line 78 to a memory or a communication channel.

The above-explained embodiment employs Hadamard transformation for frequency analysis, but there may also be employed other orthogonal transformations such as cosine transformation or K-L transformation. Also, instead of the look-up tables in the vector quantizers, there may be employed a microprocessor for calculating the optimum reproduction vectors.

Furthermore the size or the shape of the unit block for encoding is not limited to that in the present embodiment but can be suitably selected according for example to the density of the image to be encoded, and the number of classes and the number of bands can naturally be selected at optimum values.

The above-explained image encoding method, for dividing image information into plural blocks each consisting of plural pixels and effecting the encoding in the unit of a block, allows to achieve encoding adapted to the image in each block, since frequency analysis of the image is conducted in each block to classify each block as one of plural classes according to the frequency and the image of each block is encoded according to the class. It also allows encoding without affecting the reproducibility of the image constituting each block, since frequency analysis of the image is conducted in each block to classify the frequency components of each block into plural bands, and the image of each block is encoded independently in said bands. Furthermore, since each block is divided into plural sub-blocks and the encoding is conducted for each sub-block while a parameter for modifying said sub-block is attached to the encoded data of each sub-block, it is rendered possible to effect correction or processing on the encoded data, and to effect such correction or processing for each necessary frequency component of the image.

Furthermore image transmission with satisfactory transmission response and with a high compression rate can be realized, since the image of each block is encoded with plural encoding data for different frequency components, and the transmission is conducted in such a manner that the encoded data of a first frequency component of the entire image is followed by those of a second frequency component of the entire image. Furthermore, as in the image of each block is encoded at least in one of frequency components, and the encoded data are transmitted with data, indicating the presence or absence of the encoded data of other frequency components in each block, it is made possible to dispense with the transmission of the encoded data of unnecessary frequency components. The compression efficiency can therefore be further improved.

In the foregoing embodiments, the encoded data obtained by band division are transmitted in an order from lower frequency to higher, but another order may be preferable for certain images. In the following there will be explained an embodiment capable of meeting such requirement.

At first there will be explained the basic concept of the present embodiment.

Firstly, images are information sources of very high correlation, and frequency analysis provides different power concentrations depending on the image structure in the block. This property is utilized for identifying the state of image in the block, and the encoding is conducted according to the classification. Also at the encoding in each class, the block is divided into plural bands, and the encoding, transmission and and reproduction are conducted from the band of higher power, thereby clarifying the feature of the image rapidly and thus improving the man-machine interface.

Secondly, at the decoding, a most general value, such as the central value of the dynamic range or the satistical average value, is utilized as the untransmitted coefficient to enable rapid recognition of the resolution rather than the tonal rendition for example at the edges of characters, thus enabling interruption of the transmission or reproduction.

In the following there will be explained an encoder and a transmitter employed in the encoded data transmission of the present embodiment. FIG. 27 is a schematic view thereof. An orthogonal transformer 21 executes orthogonal transformation on each block (4×4 pixels in the present embodiment) of the image entered through a signal line 120. In the present embodiment, an Hadamard transformation on 4×4 pixels is employed as the orthogonal transformation, as in the foregoing embodiments. Said Hadamard transformation generates 16 transformation coefficients $Y_{11}$–$Y_{44}$, which are transmitted through signal lines 121. FIG. 28 conceptually show the Hadamard transformation, in which 4×4 pixel data $X_{11}$, $X_{12}$, ..., $X_{44}$ shown in (a) are converted into sequence componenets $Y_{11}$, $Y_{12}$, ..., $Y_{44}$ shown in (b).

Figure 30:
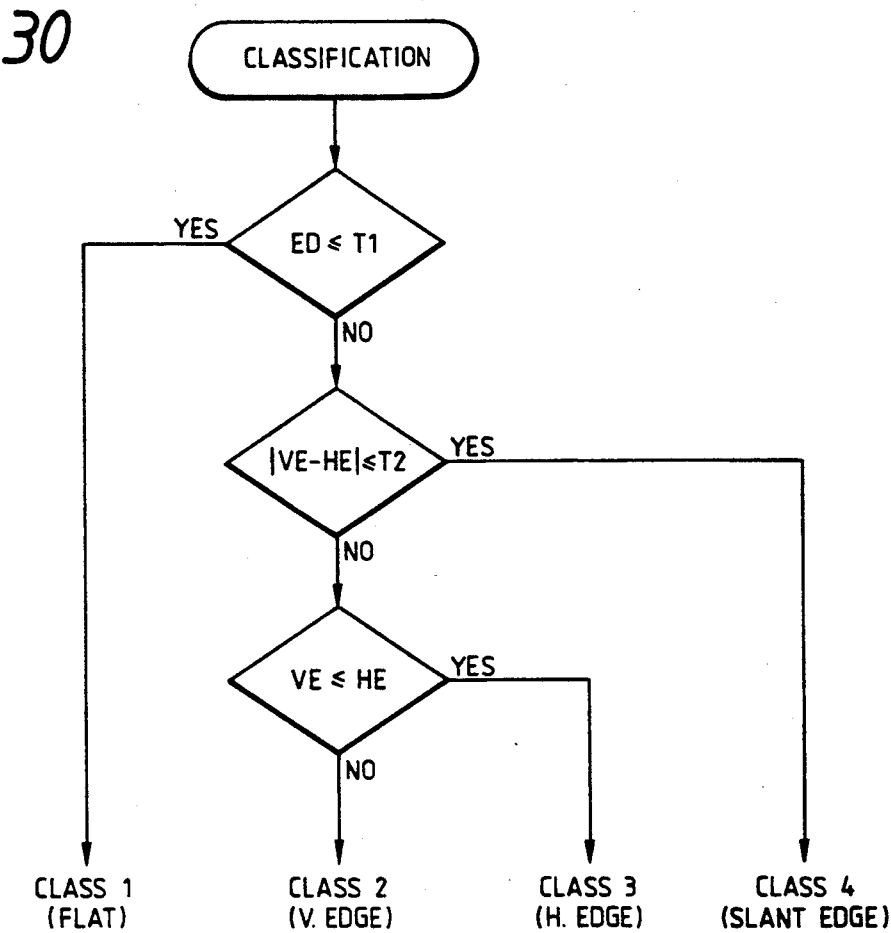
FIG. 30 is a flow chart showing a classifying method.

Referring to FIG. 27, a classifier 82 classifies the blocks, by analyzing $Y_{11}$–$Y_{44}$ from the orthogonal transformer 81, into four classes according to the frequency, and releases the result of said classification as a 2-bit class code signal to a signal line 122. FIGS. 29 and 30 show the method of classification by the classifier 82. In the present embodiment, three edge quantities as shown in FIG. 29 are defined for analyzing the Hadamard transformation coefficients. The elements in the blocks shown in FIG. 29 correspond to those in FIG. 28B. FIG. 28A shows the edge quantity ED. Hadamard transformation of an image containing an edge causes power concentration in the hatched area. This property is utilized, and the block is classified as 1 (flat area) if ED≦T1 (threshold value) as shown in FIG. 30. Also an image including a vertical edge or a horizontal edge respectively shows a large vertical edge quantity VE shown in FIG. 29B or a large horizontal edge quantity HE shown in FIG. 29C. Furthermore, a small difference |VE−HE| often indicates an image involving a slant edge. Utilizing these properties, the blocks are divided into the class 2 (vertical edge), class 3 (horizontal edge) or class 4 (slant edge) as shown in FIG. 30, in which T2 represents a threshold value.

Figure 31:
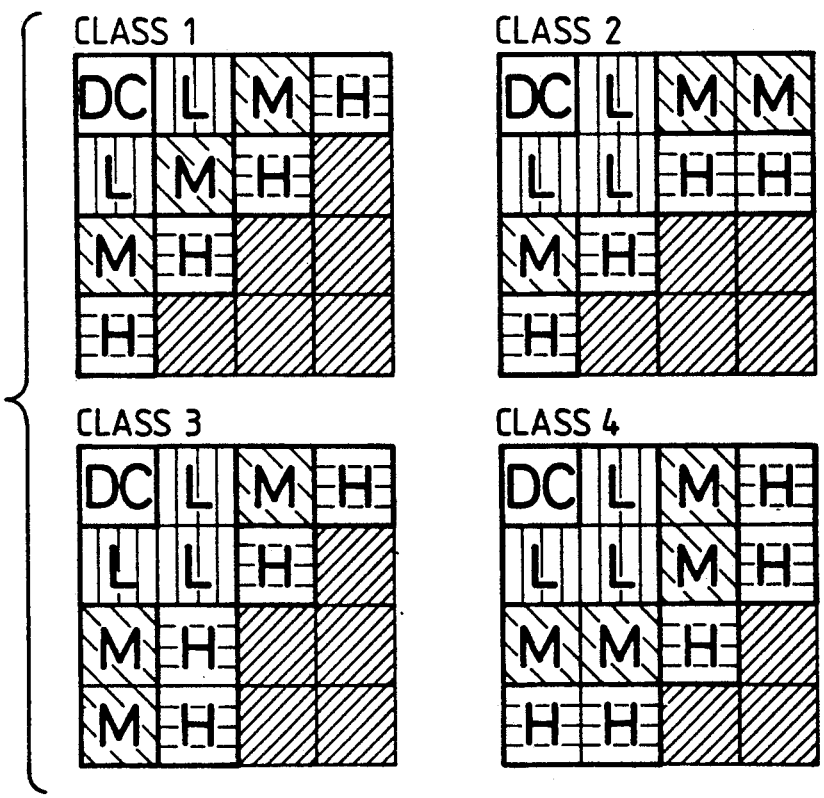
FIG. 31 is a view showing an example of band division.

Again referring to FIG. 27, a band divider 83 receives, through the signal line 122, the class code signal from the classifier 82, and divides the $Y_{11}$–$Y_{44}$ from the orthogonal transfromer 81 into L, M and H bands as shown in FIG. 31 according to the classification. The hatched area indicates the positions of data not to be encoded. L, M and H respectively indicate low, medium and high frequency components. $Y_{11}$ is a DC component, represented as DC. The band divided coefficients are respectively encoded by means of scalar quantizers (SQ) 85–87 and vector quantizers 88–90.

The DC componenet $Y_{11}$, transmitted through a signal line 123, is quantized by a scalar quantizer 84, and the obtained data are supplied to a selector 91 through a signal line 127. The coefficients of the L, M and H bands are respectively supplied, through signal lines 124–126, to scalar quantizers 85, 86, 87 for scalar quantization, and the obtained outputs are respectively supplied, through signal lines 128–130, to vector quantizers 88–90 for vector quantization thereby obtaining corresponding indexes, which are supplied through signal lines 131–133 to the selector 91.

In the following explained is the method of transmission.

The selector 91 is controller by an unrepresented controller. Also in FIG. 27, pixel data are supplied through the singal line 120, from an unrepresented image memory. The access to said memory is made in the unit of each block, starting from a start point (for example at the upper left corner) of the image and ending at an end point (for example at the lower right corner). The cycle of said access from said start point to said end point is repeated four times.

The selector 91 releases the output codes for each cycle and each class, by selecting the band and DC componenets entered through the singal lines 127, 131, 132, 133.

Figure 32A:
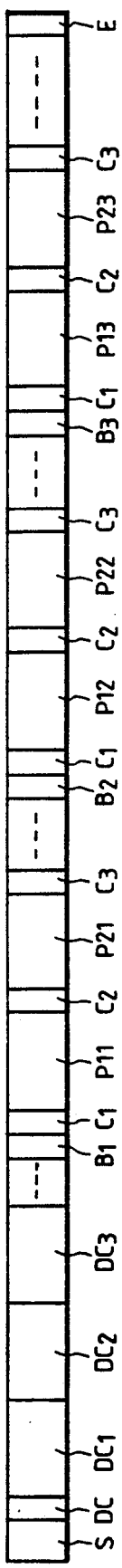
FIGS. 32A to 32C is a view showing the state of transmission of encoded data embodying the present invention.

FIG. 32A shows a first embodiment of the code transmission. At first, codes of the DC componenets, representing roughest information and corresponding to the average values, are sent for the entire image. There are shown a status code S indicating for example the image size; a flag DC indicating subsequent transmission of the codes of DC components of the blocks until a flag $B_1$ is later transmitted; and codes $DC_i$ (i=1,2, ...) of the DC components of the blocks.

After the transmission of the DC components of all the blocks, there is transmitted the flag $B_1$, indicating subsequent transmission of the codes representing rough image information, until another flag $B_2$ is later transmitted. Then, $C_i$ is a class code indicating the class of each block. Subsequent $P_{ij}$ is an index indicating a band most characteristic of the class, among the bands to be encoded other than the DC components. For example the band L is assigned to the class 1, 2 or 3, and the band M is assigned to the class 4, and such assignment is determined in advance for each class.

The transmission for the class 1, 2 or 3 is conducted in the order of bands L. M and H, and that for the class 4 is conducted in the order of bands M, L and H.

A flag $B_2$ indicates transmission of the codes representing less rougher image information, and a flag $B_3$ indicates transmission of the codes representing most detailed image information. $P_{ij}$ (i=1, ..., j=1, 3) is an index for each block.

FIG. 33 schematically shows a decoder. The transmitted information is divided, by a distributer 155, into encoded information 160, class information 161 and band information 162. The encoded information the band 160 is supplied to a matrix developing unit 150 to obtain a matrix of decoded transformation coefficients, which are released through signal lines 163. The components of said matrix are all "0" except in a band transmitted in the current cycle.

The already transmitted codes were decoded in a reverse transformer 154 and stored in the form of pixel values in an image memory 151. Thus the values of a corresponding block are taken out from said image memory 151, and supplied to an orthogonal transformer 152 to obtain a matrix of transformation coefficients to a signal line 164.

An adder 153 executes addition of each coefficient supplied through the signal lines 163, 164 except for the DC component, and executes substitution for the DC component if necessary, to regenerate the transformation matrix. It is then supplied to the transformer 154, and the obtained result is stored in the image memory 151 through signal lines 165. The stored image is displayed from time to time on a display unit 156.

Figure 34:
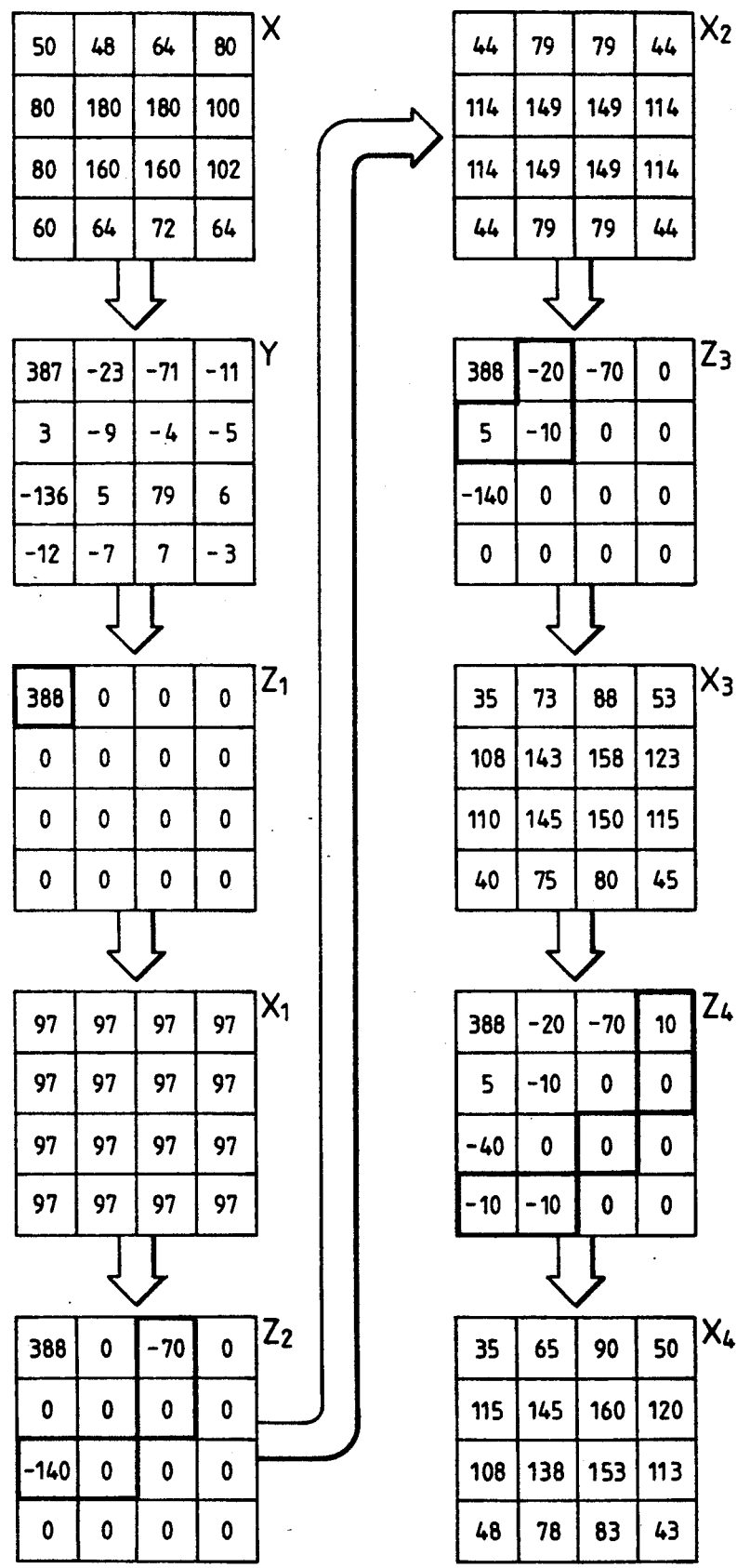
FIG. 34 is a view showing the states of decoding.

FIG. 34 illustrates an example of code transmission of image information and decoding thereof explained above.

An input block X, consisting of 8 bit pixels, is subjected to an Hadamard transformation in the orthogonal transformer 81 to obtain a transformation coefficient matrix Y, which is identified as class 4 in the classifier 82. The transmission is thereafter made in plural cycles.

In the first cycle, the selector 91 only transmits the result of scalar quantization of the DC component. In FIG. 34, a bold frame indicates the band transmitted in the corresponding cycle. In this state the transformation coefficients $Y_{12}$-$Y_{44}$, excluding the DC component, are not yet transmitted. In 4×4 Hadamard transformation, $Y_{12}$-$Y_{44}$ assume values in a range from −510 to 510, with a central value 0, which is placed in the untransmitted portion to obtain a transformation matrix $Z_1$. This is reverse transformed at the decoding side to obtain a reproduced matrix $X_1$, which is shown on the display unit 156.

As the block is identified as class 4, the selector 91 transmits, in the second cycle, the quantized coefficients of the band M. At the decoding side, the block $X_1$ is subjected to orthogonal transformation to obtain the block $Z_1$, to which the coefficients of the band M are added to obtain a transformation matrix $Z_2$. This is again reverse transformed to obtain a reproduced block $X_2$, which is then displayed.

In the third cycle, the coefficients of the band L are transmitted and added to the matrix obtained by orthogonal transformation of the block $X_2$ to obtain a matrix $Z_3$, which is reverse transformed to obtain a block $X_3$. In the fourth cycle, the coefficients of the band H are transmitted and added to the matrix obtained by orthogonal transformation of the block $X_3$ to obtain a matrix $Z_4$, which is reverse transformed into a block $X_4$. The transmission is completed in this manner.

Figure 32B:
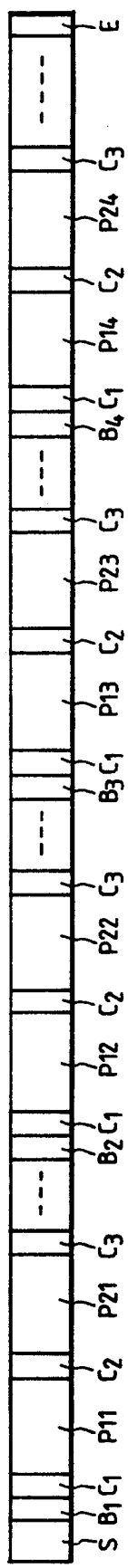

FIG. 32B shows a second embodiment of the code transmission, in which a status code S indicates the image size. Different from the foregoing first embodiment, the status code is followed by the codes representing roughest image information, instead of the DC componenets. More specifically, at first transmitted is the flag $B_1$ indicating subsequent transmission of the codes representing roughest image information. Then transmitted are the class code $C_i$ of each block and the codes $P_{ij}$ of the roughest image information of each block.

Said roughest image information is the DC componenet for a block of class 1, or the codes of the band L for a block of class 2 or 3, or those of the band M for a block of class 4.

Then the flag $B_2$, indicating the transmission of rough image information, is followed by the codes of the band L for the class 1 or 4, or those of the band M for the class 2 or 3.

Then the flag $B_3$, indicating the transmission of less rough image information, is followed by the codes of the band M for the class 1, or the codes of the DC component for the class 2, 3 or 4. Finally, the flag $B_4$, indicating the transmission of the most detailed image information, is followed by the codes of the band H for all classes.

Figure 35:
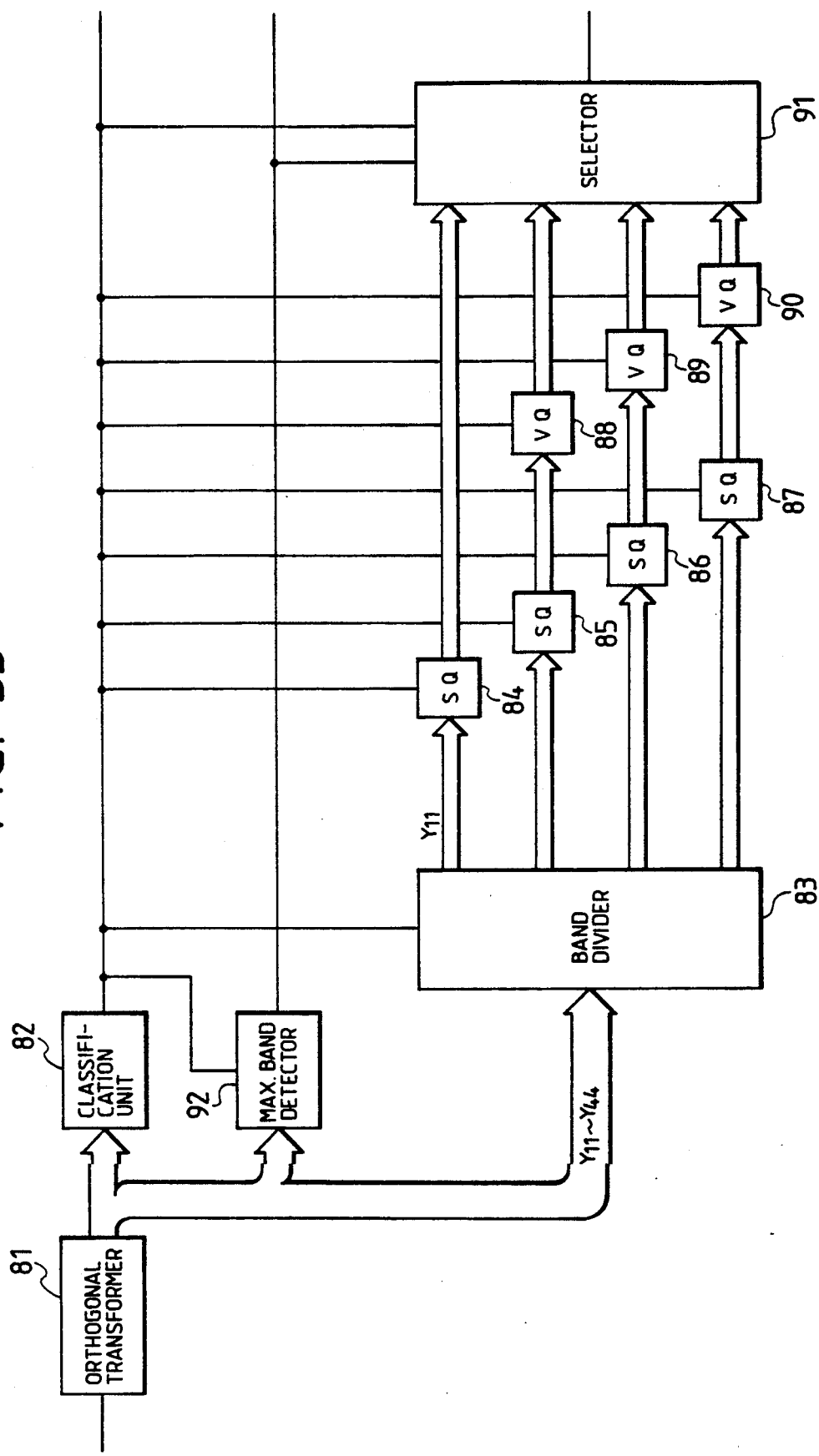
FIG. 35 is a schematic view showing another encoder.

FIG. 35 schematically illustrates another embodiment of the encoder and decoder, wherein components 81-91 are same as those in FIG. 27. A maximum band value detector 92 detects the maximum value of each band, and determined the order of transmission to the selector 91 according to the descending order of the maximum values. However, the band H is always transmitted last, since it is quite improbable that the largest maximum value appears in the band H.

At the transmission, the class code of each block is accompanied by a code $F_i$ indicating the band.

Since $Y_{11}$ assumes a value from 0 to 1020 while other coefficients assume values from −510 to 510, the comparison in the detector 92 is effected after the subtraction of 510 from the value of $Y_{11}$.

Figure 32C:
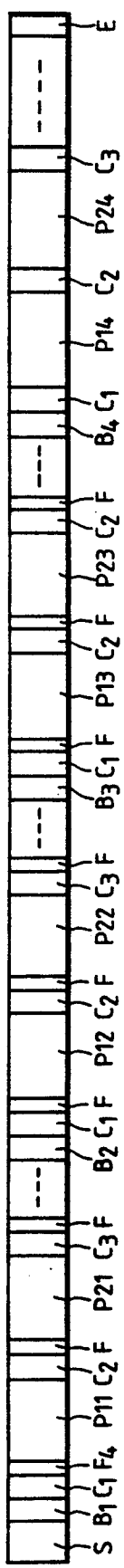

FIG. 32C shows the state of transmission of thus prepared codes, in which S is a status code as in the foregoing embodiments. Also flags $B_1$, $B_2$, $B_3$ and $B_4$ respectively indicate transmission of the roughest, rough, less rough and detailed image information. There are also provided a class code $C_i$ and an index $P_{ij}$.

In the first, second or third cycle, the codes for each block consists of a 2-bit class code $C_i$ indicating the class; a 2-bit band flag $F_i$ indicating band L, M or DC; and indexes $P_{ij}$. The decoding is conducted, based on the class code and the band flag.

Figure 36:
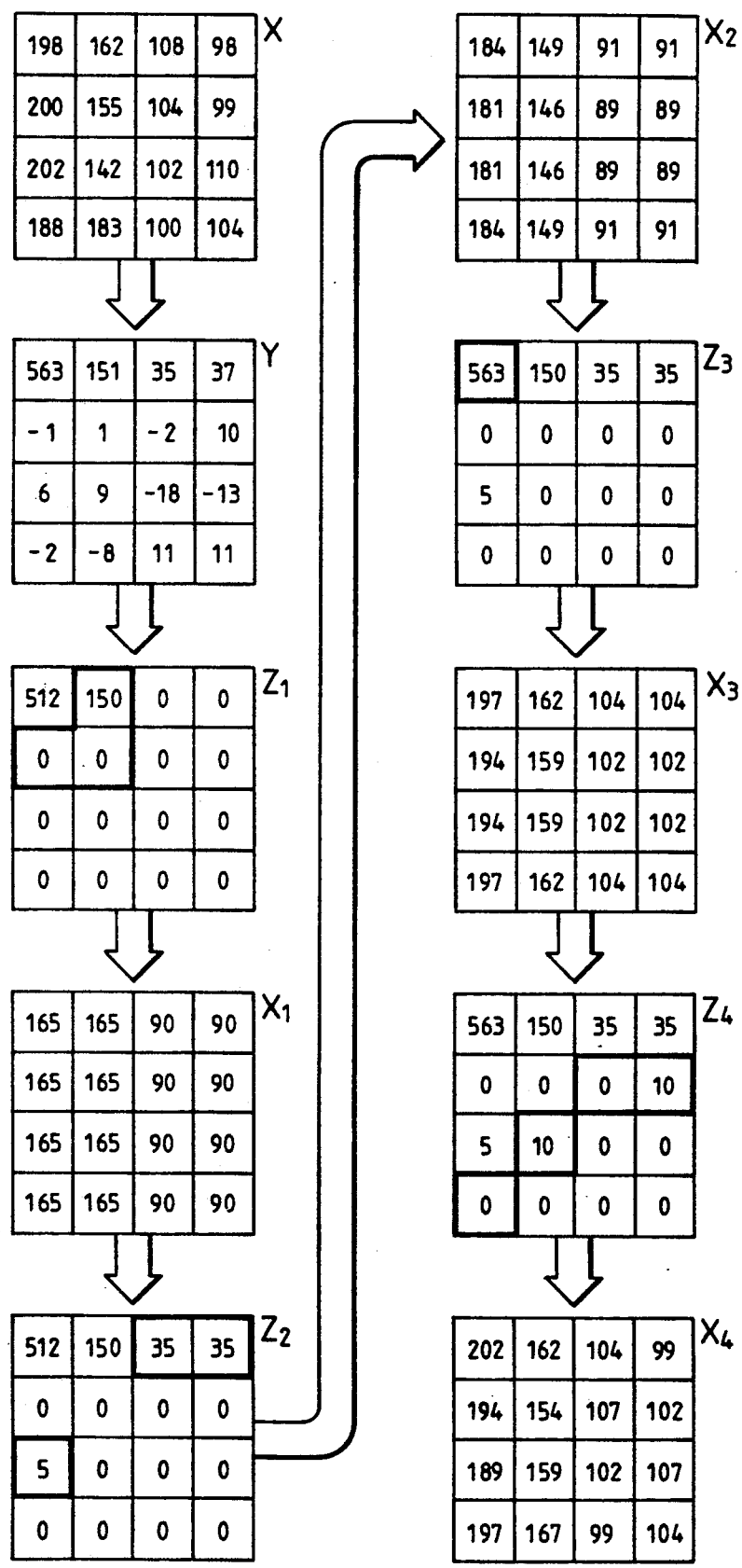
FIGS. 36 and 37 are views showing other examples of the states of decoding.
Figure 37:
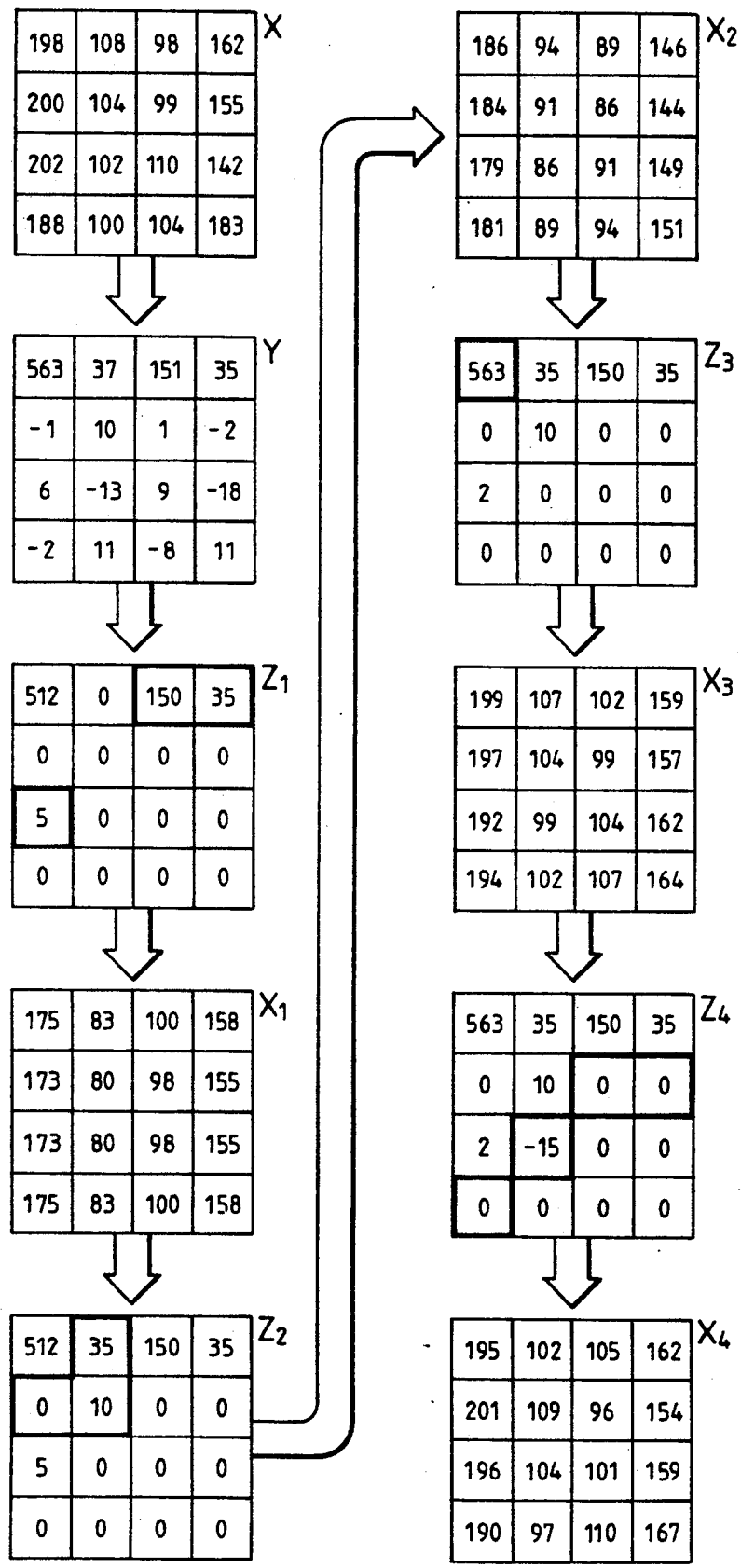

Such form of transmission enables the user to obtain desired information promptly, as the roughest image. Examples of such transmission are shown in FIGS. 36 and 37, in which X, Y, $Z_1$, $Z_2$, $Z_3$, $Z_4$, $X_1$, $X_2$, $X_3$ and $X_4$ are same as those explained before, and bold frames indicate the band transmitted in the corresponding cycle. In FIGS. 36 and 37, the block X is identified as class 2, involving a vertical edge. However, in case of FIG. 36, the transmission is conducted in an order of the band L, band M, DC and band H, while said order in FIG. 37 is the band M, band L, DC and band H. Thus the image displayed on the display unit 156 is optimized in succession in the order of $X_1$, $X_2$, $X_3$ and $X_4$.

In the foregoing embodiments, an Hadamard transformation is employed as the orthogonal transformation, but there may be employed other orthogonal transformations such as cosine transformation or K-L transformation. Also a scalar quantization and a vector quantization have been employed for encoding each band, but they are not limitative.

Figure 38:
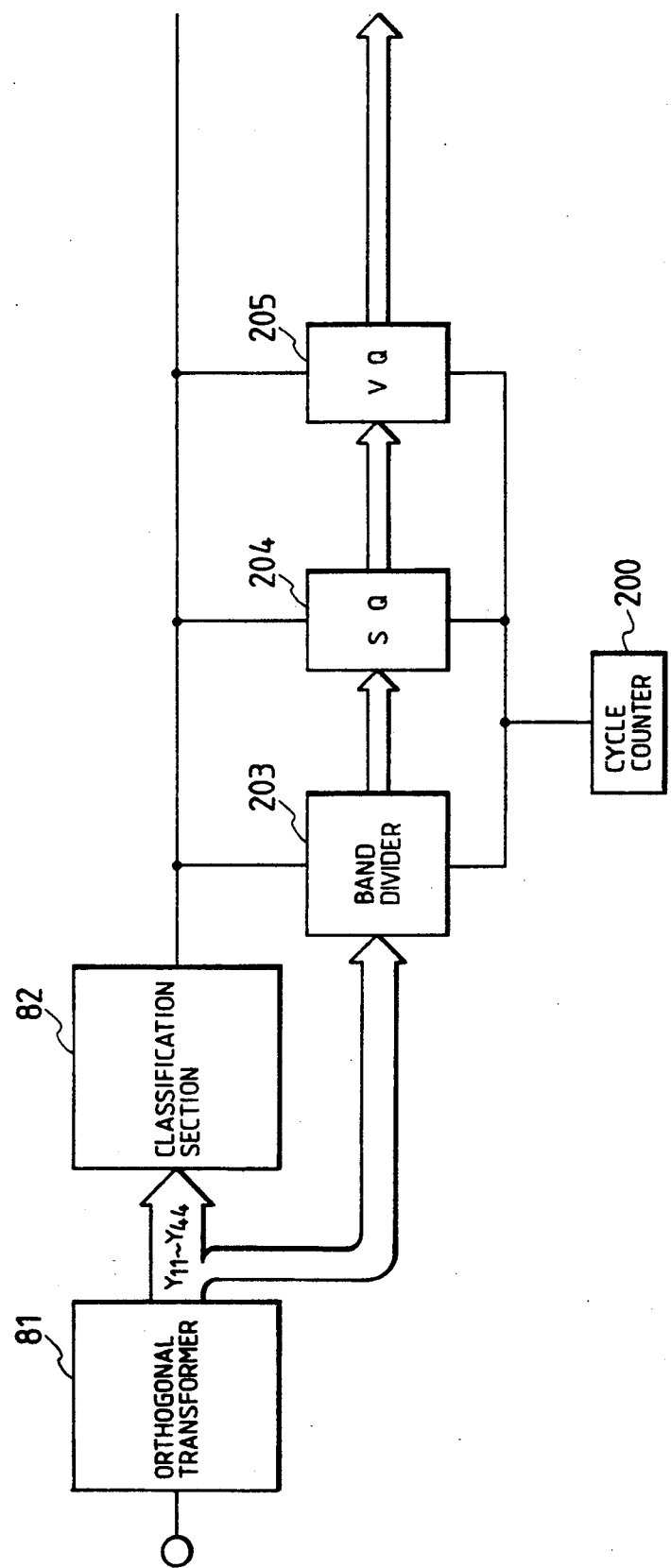
FIG. 38 is a view showing another example of the encoder.

Also instead of using an encoder for each band, it is possible, as shown in FIG. 38, to count the cycles of encoding and transmission with a cycle counter 200 and accordingly switch a band divider 203, a scaler quantizer 204 and a vector quantizer 205. The structure of the encoder is not limited to such embodiments. Also the method of classification and the number of classes are not limited. Furthermore the order of transmission may be determined based on the comparison of the average value in each band.

As explained in the foregoing, there is provided an advantage that the user can recognize the transmitted image in an early stage, since the received image is at first given roughly and progressively improved in details with the lapse of time. Also the selection of transmitted band according to the state of power concentration provides an advantage of promptly giving tonal rendition in the flat area and resolution in edge portions such as of characters.

As explained in the foregoing, the present embodiment provides an image encoding method for dividing the image information into plural blocks each consisting of plural pixels and effecting the encoding in the unit of a block, wherein each block is encoded with plural encoding data and the transmission is started, among plural encoded data from those of a band in which the transformation coefficient is large, so that the feature or content of the transmitted image can be recognized promptly without awaiting the completion of decoding of the codes of the entire image.

The present invention is not limited by the foregoing preferred embodiments but is subject to various modifications and variations within the scope and spirit of the appended claims.

What is claimed is:

1. An image encoding method comprising the steps of:
   dividing image information into plural blocks, each consisting of plural pixels;
   analyzing image frequency in each block;
   separating frequency components of the image in each block into plural bands; and
   encoding the frequency components contained in said plural bands to mutually different predetermined length of codes on each band, respectively.

2. A method according to claim 1, wherein said separating step performs different separating operations in accordance with the image frequency in each block.

3. A method according to claim 1, wherein said analyzing step performs an orthogonal transformation of the image in each block.

4. A method according to claim 1, wherein said encoding step performs different encoding operations in accordance with the image frequency in each block.

5. A method according to claim 4, wherein said encoding step varies the number of bands of encoded data representing each block, in accordance with the image frequency in each block.

6. A method according to claim 1, further comprising a step of:
   transmitting encoded data, representing the image information of a frame, for each band.

7. A method according to claim 6, wherein said transmitting step starts transmission from encoded data of a band selected in accordance with the image frequency in each block.

8. An image encoding apparatus comprising:
   analyzing means for dividing image information into plural blocks, each consisting of plural pixels, and analyzing image frequency in each block; and
   encoding means for separating frequency components of the image frequency in each block into plural bands, and respectively encoding the frequency components contained in said plural bands to mutually different predetermined length of codes on each band, respectively.

9. An apparatus according to claim 8, wherein said encoding means is adapted to separate the image information into plural bands in different manners in accordance with the image frequency in each block.

10. An apparatus according to claim 8, wherein said analyzing means is adapted to effect frequency analysis by an orthogonal transformation of the image in each block.

11. An apparatus according to claim 8, wherein said encoding means is adapted to perform different encoding operations, in accordance with the image frequency in each block.

12. An apparatus according to claim 11, wherein said encoding means is adapted to vary the number of bands of the encoded data representing each block, in accordance with the image frequency in each block.

13. An apparatus according to claim 8, further comprising transmitting means for transmitting, for each band, encoded data representing the image information of a frame.

14. An apparatus according to claim 13, wherein said transmitting means is adapted to effect transmission starting from encoded data of a band selected in accordance with the image frequency in each block.

15. An image encoding method comprising the steps of:
   dividing image information into plural blocks, each consisting of plural pixels;
   analyzing image frequency in each block;
   classifying each block into one of plural classes in accordance with the image frequency therein;
   separating frequency components of the image frequency in each block into plural bands in accordance with the class classified in said classifying step; and
   encoding the frequency components contained in said plural bands, respectively.

16. A method according to claim 15, wherein said encoding step is adapted to vary the number of encoded data representing each block, in accordance with the class classified by the classifying.

17. A method according to claim 15, wherein said analyzing step includes performance of an orthogonal transformation of the image frequency in each block.

18. A method according to claim 15, wherein said encoding step is adapted to encode the image in each block into plural encoded data respectively corresponding to different frequency components.

19. A method according to claim 18, further comprising the step of transmitting the encoded data, representing the image information of a frame, on a serial basis in each band.

20. An image encoding apparatus comprising:
   analyzing means for dividing image information into plural blocks, each consisting of plural pixels, and analyzing image frequency in each block;
   classifying means for classifying each block into one of plural classes in accordance with the image frequency therein; and
   encoding means for separating frequency components of the image frequency in each block into plural bands in accordance with the class classified by said classifying means, and encoding the frequency components contained in said plural bands, respectively.

21. An apparatus according to claim 20, wherein said encoding means is adapted to vary the number of encoded data representing each block, in accordance with said class classified by the classifying means.

22. An apparatus according to claim 20, wherein said analyzing means is adapted to effect frequency analysis by an orthogonal transformation of the image frequency in each block.

23. An apparatus according to claim 20, wherein said encoding means is adapted to encode the image frequency in each block into plural encoded data corresponding to different frequency components.

24. An apparatus according to claim 23, further comprising transmitting means for transmitting the encoded data, representing the image information of a frame, on a serial basis in each band.

25. An image encoding method comprising the steps of:
   dividing image information into plural blocks, each block having a fixed size and consisting of plural pixels;
   discriminating a presence/absence of an edge portion of the image in each block;

classifying each block into one of plural classes in accordance with the presence/absence of an edge portion;

separating the image information in each block into plural sub-blocks in accordance with the class classified in said classifying step; and encoding the image contained in said plural sub-blocks, respectively.

26. A method according to claim 25, wherein, in said encoding step, the number of the encoded data representing plural sub-blocks is varied, in accordance with the class.

27. A method according to claim 25, wherein, in said discriminating step, edge information in the image in each block is discriminated, by analyzing the frequency of the image information.

28. A method according to claim 27, wherein, in said discriminating step, frequency analysis of the image in each block is effected by an orthogonal transformation.

29. A method according to claim 25, wherein, in said encoding step, the image in plural sub-blocks is encoded into plural encoded data respectively corresponding to different frequency components.

30. An image encoding apparatus comprising:

discriminating means for dividing image information into plural blocks, each block having a fixed size and consisting of plural pixels, and discriminating a presence/absence of an edge portion of the image in each block;

classifying means for classifying each block into one of plural classes in accordance with the presence/absence of an edge portion; and encoding means for separating the image information in each block into plural sub-blocks in accordance with the class classified by said classifying means, and for encoding the image information contained in said plural sub-blocks, respectively.

31. An apparatus according to claim 30, wherein said encoding means is adapted to vary the number of encoded data representing plural sub-blocks, in accordance with said class.

32. An apparatus according to claim 30, wherein said discriminating means is adapted to discriminate the edge information, by frequency analysis of the image in each block.

33. An apparatus according to claim 32, wherein said discriminating means is adapted to effect frequency analysis by an orthogonal transformation of the image in each block.

34. An apparatus according to claim 30, wherein said encoding means is adapted to encode the image in each block into plural encoded data corresponding to different frequency components.

35. An image encoding method comprising the steps of:

dividing image information into plural blocks, each consisting of plural pixels;

separating frequency components of the image in each block into plural bands;

encoding the frequency components contained in said plural bands, respectively; and transmitting, on a serial basis in each band, the encoded data representing the image information of a frame.

36. A method according to claim 35, wherein, in said separating step, the separation operation is performed differently in accordance with image frequency in each block.

37. A method according to claim 35, wherein said separating step further comprises the step of analyzing image frequency in each block.

38. A method according to claim 37, wherein, in said analyzing step, an orthogonal transformation of the image in each block is performed.

39. A method according to claim 35, wherein, in said encoding step, encoding is performed differently in accordance with image frequency in each block.

40. A method according to claim 39, wherein, in said encoding step, the number of bands of the encoded data representing each block is varied, in accordance with the image frequency in each block.

41. A method according to claim 35, wherein, in said transmitting step, transmission is started from encoded data of a selected band in accordance with the image in each block.

42. An image encoding apparatus comprising:

analyzing means for dividing image information into plural blocks, each consisting of plural pixels, and analyzing image frequency in each block;

encoding means for separating frequency components of the image in each block into plural bands, and encoding the frequency components contained in said plural bands, respectively; and transmitting means for transmitting, on a serial basis in each band, the encoded data representing the image information of a frame.

43. An apparatus according to claim 42, wherein said encoding means is adapted to separate the image information into plural bands in different manners in accordance with the image frequency in each block.

44. An apparatus according to claim 42, wherein said analyzing means is adapted to effect frequency analysis by an orthogonal transformation of the image in each block.

45. An apparatus according to claim 42, wherein said encoding means is adapted to perform different encoding operations, in accordance with the image frequency in each block.

46. An apparatus according to claim 45, wherein said encoding means is adapted to vary the number of bands of the encoded data representing each block, in accordance with the image frequency in each block.

47. An apparatus according to claim 42, wherein said transmitting means is adapted to effect transmission starting from encoded data of a band selected in accordance with the image in each block.

48. An image encoding method comprising the steps of:

dividing image information into plural blocks, each consisting of plural pixels;

separating frequency components of the image in each block into plural bands;

encoding the frequency components contained in each of said plural bands; and transmitting the image information of a frame, starting from the encoded data of a band selected in accordance with the image in each block.

49. A method according to claim 48, wherein, in said separating step, the separation operation is performed differently in accordance with image frequency in each block.

50. A method according to claim 48, wherein said separating step further comprises the step of analyzing image frequency in each block.

51. A method according to claim 50, wherein, in said analyzing step, an orthogonal transformation of the image in each block is performed.

52. A method according to claim 48, wherein, in said encoding step, encoding is performed differently in accordance with image frequency in each block.

53. A method according to claim 52, wherein, in said encoding step, the number of bands of the encoded data representing each block is varied, in accordance with the image frequency in each block.

54. An image encoding apparatus comprising:
analyzing means for dividing image information into plural blocks, each consisting of plural pixels, and analyzing image frequency in each block;
encoding means for separating frequency components of the image in each block into plural bands, and encoding the frequency components contained in each of said plural bands; and
transmitting means for transmitting the image information of a frame starting from the encoded data of a band selected in accordance with the image in each block.

55. An apparatus according to claim 54, wherein said encoding means is adapted to separate the image information into plural bands in different manners in accordance with the image frequency in each block.

56. An apparatus according to claim 54, wherein said analyzing means is adapted to effect frequency analysis by an orthogonal transformation of the image in each block.

57. An apparatus according to claim 54, wherein said encoding means is adapted to perform different encoding operations, in accordance with the image frequency in each block.

58. An apparatus according to claim 57, wherein said encoding means is adapted to vary the number of bands of the encoded data representing each block, in accordance with the image frequency in each block.

59. An image encoding method comprising the steps of:
dividing image information into plural blocks, each block having a fixed size and consisting of plural pixels;
transforming the plural pixels into a plurality of frequency components;
extracting first and second set of frequency components from the frequency components of each block;
encoding each of said first and second sets of frequency components;
adding a parameter relating to said first or second set of frequency components to the encoded data of said first or second set of frequency components.

60. A method according to claim 59, wherein, in said extracting step, frequency components of the image in each block are separated into plural sub-blocks.

61. A method according to claim 59, wherein, in said adding step, a parameter for image transformation is added.

62. A method according to claim 59, wherein said extracting step further comprises the step of analyzing image frequency in each block.

63. A method according to claim 62, wherein, in said transforming step, an orthogonal transformation of the image in each block is performed.

64. A method according to claim 59, wherein, in said encoding step, encoding is performed differently in accordance with image frequency in each block.

65. An image encoding apparatus comprising:
dividing means for dividing image information into plural blocks, each block having a fixed size and consisting of plural pixels;
transforming means for transforming the plural pixels into a plurality of frequency components;
extracting means for extracting first and second sets of frequency components from the frequency components of each block;
encoding means for encoding each of said first and second sets of frequency components;
adding means for adding a parameter relating to said first or second set of frequency components to the encoded data of said first or second set of frequency components.

66. An apparatus according to claim 65, wherein said adding means is adapted to add a parameter for image transformation.

67. An apparatus according to claim 65, wherein said encoding means is adapted to encode the first and second set of frequency components by different methods, respectively.

68. An apparatus according to claim 65, wherein said transforming means is adapted to effect frequency analysis by an orthogonal transformation of the image in each block.

69. An apparatus according to claim 65, wherein said encoding means is adapted to perform different encoding operations, in accordance with the image frequency in each block.

70. The image decoding method comprising steps of:
entering plural encoded data obtained by encoding image information of different frequency components;
storing first image information obtained by decoding of the encoded data of a first frequency component; and
adding second image information, obtained by decoding of the encoded data of a second frequency component, to said first image information in a real image space.

71. A method according to claim 70, wherein, in said entering step, data encoded for plural blocks each consisting of plural pixels is entered.

72. A method according to claim 70, further comprising the step of displaying the first image information stored in said storing step.

73. A method according to claim 70, further comprising the step of storing the image information obtained in said adding step.

74. An image decoding apparatus comprising:
input means for entering plural encoded data obtained by encoding image information for different frequency components;
decoding means for decoding the encoded data to obtain decoded image data;
memory means for storing the decoded image information; and
adding means for adding first image information obtained by decoding the encoded data of a first frequency component and stored in said memory means, to second image information obtained by decoding the encoded data of a second frequency component, in a real image space.

75. An apparatus according to claim 74, further comprising display means for displaying the first image information stored in said memory means.

76. An apparatus according to claim 74, wherein said memory means is further adapted to store the image information obtained by addition in said adding means.

77. An image encoding method comprising the steps of:
dividing image information into plural blocks, each consisting of plural pixels;
analyzing image frequency in each block;
classifying each block into one of plural classes in accordance with a frequency of the image therein;
separating frequency components of the image in each block into a band or bands the number of which is in accordance with the class classified in said classifying step; and
encoding the frequency components contained in said band or bands separated in said separating step, respectively.

78. An image encoding method according to claim 77, wherein, in said encoding step, the number of encoded data representing each block is varied in accordance with class.

79. An image encoding method according to claim 77, wherein said analyzing step includes performing an orthogonal transformation of the image in each block.

80. An image encoding method according to claim 77, wherein said encoding step includes encoding the image in each block into plural encoded data respectively corresponding to different frequency components.

81. An image encoding method according to claim 80, further comprising the step of transmitting on each frequency component the encoded data representing the image information of a frame.

82. An image encoding apparatus comprising:
analyzing means for dividing image information into plural blocks, each consisting of plural pixels, and analyzing image frequency in each block;
classifying for classifying each block into one of plural classes in accordance with the image frequency therein;
separating means for separating frequency components of the image in each block into a band or bands the number of which is in accordance with the class classified by said classifying means; and
encoding means encoding the frequency components contained in said band or bands separated by said separating means.

83. An image encoding apparatus according to claim 82, wherein said encoding means is adapted to vary the number of encoded data representing each block in accordance with class.

84. An image encoding apparatus according to claim 82, wherein said analyzing means is adapted to effect frequency analysis by an orthogonal transformation of the image in each block.

85. An image encoding apparatus according to claim 82, wherein said encoding means is adapted to encode the image in each block into plural encoded data respectively corresponding to different frequency components.

86. An image encoding apparatus according to claim 82, further comprising transmitting means for transmitting on each frequency component the encoded data representing the image information of a frame.

87. An image encoding apparatus comprising:
dividing means for dividing image data into plural blocks, each block having a fixed size and consisting of plural pixels;
transformation means for performing an orthogonal transformation of the image data in said plural blocks and outputting plural frequency components;
first encoding means for encoding a first frequency component among the plural frequency components and outputting first coded data;
second encoding means for encoding a second frequency component, the frequency of which is higher than the first frequency component, and outputting second coded data; and
transmission means for transmitting the first coded data of plural blocks of a picture and the second coded data of plural blocks of the picture;
wherein said transmission means adds boundary information between the first coded data and the second coded data, and transmits the first coded data of plural blocks, the boundary information and the second coded data of plural blocks.

88. An image encoding apparatus according to claim 87, wherein said transmission means is further adapted to transmit data representing image type of an image represented by the image data.

89. An image encoding apparatus according to claim 87, wherein said first and second encoding means is adapted to perform different encodings in accordance with a frequency of the image data transmitted by said transmission means.

90. An image encoding apparatus according to claim 89, wherein said boundary information represents an information for decoding the second coded data.

91. An image encoding method comprising the steps of:
dividing image information into plural blocks, each block having a fixed size and consisting of plural pixels;
transforming the image information into plural frequency components;
encoding a first frequency component among the plural frequency components in a block and outputting first coded data;
encoding a second frequency component, the frequency of which is higher than the first frequency component in the block, and outputting second coded data;
repeating said transforming step and plural encoding steps for plural blocks; and
transmitting the first coded data of plural blocks and the second coded data of plural blocks;
wherein in said transmitting step, the first coded data of plural blocks, boundary information between the first and the second coded data and the second coded data of plural blocks, are transmitted in this order.

92. An image encoding method according to claim 91, wherein said transforming step includes performing an orthogonal transformation of an image in each block.

93. An image encoding method according to claim 91, wherein said encoding step includes performing different encoding operations in accordance with a frequency component in each block.

94. An image encoding method according to claim 91, wherein, in said encoding step, different encodings are performed in accordance with a frequency component transmitted in said transmitting step.

95. An image encoding method according to claim 94, wherein said encoding step includes performing different encodings in a code length in accordance with a frequency component.

* * * * *

UNITED STATES PATENT AND TRADEMARK OFFICE
CERTIFICATE OF CORRECTION

PATENT NO. : 5,162,923

DATED : November 10, 1992

INVENTOR(S) : Tadashi Yoshida, et al.

PAGE 1 OF 3

It is certified that error appears in the above-identified patent and that said Letters Patent is hereby corrected as shown below:

DRAWINGS

Sheet 17, Figure 33, "DISTRIBUTER" should read --DISTRIBUTOR-- and "DEVELOPPING" should read --DEVELOPING--.

COLUMN 2

Line 61, "block" should read --blocks--.

COLUMN 4

Line 65, "thus" should be deleted.

COLUMN 6

Line 30, "FIG. 48" should read --FIG. 4B--; and
Line 34, "edge)," should be deleted.

COLUMN 7

Line 51, "compononets" should read --components--.

UNITED STATES PATENT AND TRADEMARK OFFICE
CERTIFICATE OF CORRECTION

PATENT NO. : 5,162,923
DATED : November 10, 1992
INVENTOR(S) : Tadashi Yoshida, et al.

It is certified that error appears in the above-identified patent and that said Letters Patent is hereby corrected as shown below:

COLUMN 12

Line 25, "are" should read --area--; and
Line 31, "differnece" should read --difference--.

COLUMN 19

Line 17, "length" should read --lengths--; and
Line 47, "length" should read --lengths--.

COLUMN 20

Line 21, "classifying" should read --classifying step--.

COLUMN 21

Line 66, "the separating operation" should read --separating--.

COLUMN 22

Line 63, "the separation operation" should read --separating--.

UNITED STATES PATENT AND TRADEMARK OFFICE
CERTIFICATE OF CORRECTION

PATENT NO. : 5,162,923

DATED : November 10, 1992

INVENTOR(S) : Tadashi Yoshida, et al.

It is certified that error appears in the above-identified patent and that said Letters Patent is hereby corrected as shown below:

COLUMN 24

Line 31, "The" should read --An--.

Signed and Sealed this

Fourth Day of January, 1994

Attest:

BRUCE LEHMAN

Attesting Officer      Commissioner of Patents and Trademarks